US007467115B2

(12) United States Patent (10) Patent No.: US 7,467,115 B2
Edelman et al. (45) Date of Patent: Dec. 16, 2008

(54) MOBILE BRAIN-BASED DEVICE HAVING A SIMULATED NERVOUS SYSTEM BASED ON THE HIPPOCAMPUS

(75) Inventors: Gerald M. Edelman, La Jolla, CA (US); Jeffrey L. Krichmar, Cardiff-by-the-Sea, CA (US); Douglas A. Nitz, Del Mar, CA (US)

(73) Assignee: Neurosciences Research Foundation, Inc., San Diego ( * ) Notice: Subject to any disclaimer, the term of this patent is extended or adjusted under 35 U.S.C. 154(b) by 362 days.

(21) Appl. No.: 11/179,371

(22) Filed: Jul. 12, 2005

(65) Prior Publication Data

US 2006/0129506 A1 Jun. 15, 2006

Related U.S. Application Data

(60) Provisional application No. 60/588,107, filed on Jul. 15, 2004.

(51) Int. Cl.
*G06N 5/00* (2006.01)
(52) U.S. Cl. .......................................... 706/15; 706/23
(58) Field of Classification Search .................. 706/15, 706/23, 45, 20
See application file for complete search history.

(56) References Cited

U.S. PATENT DOCUMENTS 5,920,851 A * 7/1999 Muller ........................ 706/20

6,169,981 B1 * 1/2001 Werbos ........................ 706/23
6,687,686 B1 2/2004 Nervegna

OTHER PUBLICATIONS

Barakova et al., Novelty gated episodic memory formation for robot exploration, Intelligent Systems, 2004. Proceedings. 2004 2nd International IEEE Conference, vol. 1, Jun. 22-24, 2004 pp. 116-121 vol. 1.*
Banquet et al., A hippocampal model of visually guided navigation as implemented by a mobile agent, Neural Networks, 2000. IJCNN 2000, Proceedings of the IEEE-INNS-ENNS International Joint Conference on, vol. 2, Jul. 24-27, 2000 pp. 41-46 vol. 2.*
Alvarez, P. et al., "Memory Consolidation and the Medical Temporal Lobe: A Simple Network Model," Proceedings of the National Academy of Sciences, USA, Jul. 1994, pp. 7041-7045, vol. 91.
Almassy, N., et al., Behavioral Constraints in The Development of Neuronal Properties: A Cortical Model Embedded in a Real-World Device, Cerebral Cortex, Dec. 1998, pp. 346-361, 1998, vol. 8.

(Continued)

*Primary Examiner*—Wilbert L Starks, Jr.
(74) *Attorney, Agent, or Firm*—Fliesler Meyer LLP

(57) ABSTRACT

A brain-based device (BBD) having a physical mobile device NOMAD controlling and under control by a simulated nervous system. The simulated nervous system is based on an intricate anatomy and physiology of the hippocampus and its surrounding neuronal regions including the cortex. The BBD integrates spatial signals from numerous objects in time and provides flexible navigation solutions to aid in the exploration of unknown environments. As NOMAD navigates in its real world environment, the hippocampus of the simulated nervous system organizes multi-modal input information received from sensors on NOMAD over timescales and uses this organization for the development of spatial and episodic memories necessary for navigation.

16 Claims, 13 Drawing Sheets

OTHER PUBLICATIONS

Arleo, A. et al., "Efficient Learning of Variable-Resolution Cognitive Maps for Autonomous Indoor Navigation," IEEE Transactions on Robotics and Automation, Dec. 1999, pp. 990-1000, vol. 15, No. 6.

Arleo, A. et al., "Spatial Cognition and Neuro-Mimetic Navigation: A Model of Hippocampal Place Cell Activity," Biological Cybernetics, 83, pp. 287-299 (2000).

Arleo, A. et al., "Modeling Rodent Head-Direction Cells and Place Cells for Spatial Learning in Bio-Mimetic Robotics," Paper Presented at: From Animals to Animats 6: Proceedings of the Sixth International Conference on Simulation of Adaptive Behavior, 2000, Paris, France, MIT Press, pp. 236-245.

Bachelder, I.A. et al., "Mobile Robot Visual Mapping and Localization: A View-Based Neurocomputational Architecture that Emulates Hippocampal Place Learning," Neural Networks, 1994, pp. 1083-1099, vol. 7, Nos. 6/7.

Bachelder, I.A. et al., "A View-Based Neurocomputational System For Relational Map-Making and Navigation in Visual Environments," Robotics and Autonomous Systems, 1995, pp. 267-289, vol. 16.

Bienenstock, E.L et al., "Theory for The Development of Neuron Selectivity: Orientation Specificity and Binocular Interaction in Visual Cortex," Journal of Neuroscience, 1982, pp. 32-48, vol. 2.

Blum, K.I. et al., "A Model of Spatial Map Formation in the Hippocampus of the Rat," Neural Computation, 1996, pp. 85-93, vol. 8.

Burgess, N. et al., "Robotic and Neural Simulation of the Hippocampus and Rat Navigation," Phil. Transactions, R. Soc. London, Biological Science, 1997, pp. 1535-1543, vol. 352.

Edelman, G.M., et al. "Synthetic Neural Modeling Applied to a Real-World Artifact," Aug. 1992, Proc NAtl Acad Sci USA, pp. 7267-7271, vol. 89.

Ferbinteanu, J. et al., "Prospective and Retrospective Memory Coding in The Hippocampus," Neuron, 2003, pp. 1227-1239, vol. 40.

Foster, D.J. et al., "A Model of Hippocampally Dependent Navigation, Using the Temporal Difference Learning Rule," Hippocampus, 2000, pp. 1-16, vol. 10.

Frank, L.M. et al., "Trajectory Encoding in The Hippocampus and Entorhinal Cortex," Neuron, 2000, pp. 169-178, vol. 27.

Gamini Dissanayake, M. et al., "A Solution to the Simultaneous Localization and Map Building (SLAM) Problem," IEEE Transactions on Robotics and Automation, Jun. 2001, pp. 229-241, vol. 17, No. 3.

Gaussier, P. et al, "From View Cells and Place Cells to Cognitive Map Learning: Processing Stages of the Hippocampal System," Biological Cybernetics 2002, pp. 15-28, vol. 86.

Griffiths, D., et al., "Episodic Memory: What Can Animals Remember About Their Past?" Trends in Cognitive Science, 1999, pp. 74-80, vol. 3.

Grossberg, S., "The Link Between Brain Learning, Attention and Consciousness," Conscious and Cognition, 1999, pp. 1-44, vol. 8.

Guazzelli, A. et al., "Competitive Hebbian Learning and the Hippocampal Place Cell System: Modeling the Interaction of Visual and Path Integration Cues," Hippocampus, 2001, pp. 216-239, vol. 11.

Kali, S. et al., "Off-Line Replay Maintains Declarative Memories in a Model of Hippocampal-Neocortical Interactions," Nature Neuroscience, Mar. 2004, pp. 286-294, vol. 7, No. 3.

Koene, R.A. et al., "Modeling Goal-Directed Spatial Navigation in the Rat Based on Physiological Data from the Hippocampal Formation," Neural Networks, 2003, pp. 577-584, vol. 16.

Körner, E. et al., "Cortical Architecture and Self-Referential Control for Brain-Like Computation. A New Approach to Understanding How the Brain Organizes Computation," IEEE Engineering in Medicine and Biology, Sep.-Oct. 2002, pp. 121-133.

Krichmar, J.L. et al., "A Neural Approach to Adaptive Behavior and Multi-Sensor Action Selection in a Mobile Device," Proceedings of the 2002 IEEE International Conference on Robotics & Automation, Washington, D.C., May 2002, pp. 3864-3869.

Krichmar, J.L. et al., "Machine Psychology: Autonomous Behavior, Perceptual Categorization and Conditioning in a Brain-Based Device," Cerebral Cortex, 2002, pp. 818-830, vol. 12.

Krichmar, J.L. et al., "Brain-Based Devices: Intelligent Systems Based on Principles of the Nervous System," Proceedings of the 2003 IEEE/RSJ Intl. Conference on Intelligent Robotics and Systems, Las Vegas, NV, Oct. 2003, pp. 940-945.

Mataric, M.J., "Navigating with a Rat Brain: A Neurobiologically-Inspired Model for Robot Spatial Representation," In "From Animals to Animats," J. Arcady Meyer and S.W. Wilson, eds., 1991, pp. 169-175, Cambridge, MA, MIT Press.

Milford, M. J. et al., "RatSLAM: A Hippocampal Model for Simultaneous Localization and Mapping," Proc. of the 2004 IEEE Int'l Conference on Robotics & Automation, New Orleans, LA, Apr. 2004, pp. 403-408.

Montague, P.R. et al., "A Framework for Mesencephalic Dopamine Systems Based on Predicitive Hebbian Learning," Journal of Neuroscience, Mar. 1, 1996, pp. 1936-1947, vol. 16, No. 5.

Morris, R., "Developments of a Water-Maze Procedure for Studying Spatial Learning in the Rat," Journal of Neuroscience Methods, 1984, pp. 47-60, vol. 11.

Muller, R. U. et al. "Head Direction Cells: Properties and Functional Significance", 1996, Current, Opinion Neurobiology, pp. 196-206, vol. 6.

O'Keefe, J. et al., The hippocampus as a Spatial Map. Preliminary Evidence from Unit Activity in the Freely-Moving Rat Brain Research, 1971, pp. 171-175, vol. 34, No. 1.

O'Keefe, J. et al., The Hippocampus as a Cognitive Map, 1978, Clarendon Press, Oxford.

O'Reilly, R. et al., "Computation Explorations in Cognitive Science," 2000, Cambridge, MA, MIT Press.

O'Reilly, R. et al., "Hippocampal Conjunctive Encoding, Storage, and Recall: Avoiding a Trade-Off," Hippocampus, Dec. 1994, pp. 661-682, vol. 4, No. 6.

Recce, M. et al., "Memory For Places: A Navigational Model in Support of Marr's Theory of Hippocampal Function," Hippocampus, 1996, pp. 735-748, vol. 6.

Reeke, G.N., et al., Synthetic neural modeling: the 'Darwin' series of recognition automata, Proceedings of the IEEE, Sep. 1990, pp. 1498-1530, vol. 78, No. 9.

Samsonovich, A. et al., "Path Integration and Cognitive Mapping in a continuous Attractor Neural Network Model," Journal of Neuroscience, Aug. 1, 1997, pp. 5900-5920, vol. 17, No. 15.

Schmajuk, N.U. et al., "Maps, Routes, and the Hippocampus: A Neural Network Approach," Hippocampus, Jul. 1993, pp. 387-400, vol. 3, No. 3.

Schoville, W. B. et al., "Loss of Recent Memory After Bilateral Hippocampal Lesions", Journal of Neurochemistry, 1957, pp. 11-21, vol. 20.

Seth et al., "Visual binding through reentrant connectivity and dynamic synchronization in a brain-based device," Cerebral Cortex, Nov. 2004, pp. 1185-1199, vol. 14, No. 11.

Seth et al., "Texture discrimination by an autonomous mobile brain-based device with whiskers," Proc. of IEEE Int'l Conference on Robotics and Automation, New Orleans, LA, Apr. 26-May 1, 2004, pp. 4925-4930, vol. 5.

Seth et al., "Active sensing of visual and tactile stimuli by brain-based devices," International Journal of Robotics and Automation, 2004, pp. 222-238, vol. 19, No. 4.

Shapiro, M.L. et al., "A Simple Network Model Simulates Hippocampal Place Fields: Parametric Analyses and Physiological Predictions," Behavioral Neuroscience, 1993, pp. 34-50, vol. 107, No. 1.

Sinha, S. et al., "Response of an Excitatory-Inhibitory Neural Network to External Stimulation: An Application to Image Segmentation," Artificial Neural Networks, Conference Publ'n No. 470 IEEE, Sep. 1999, pp. 803-808.

Smith et al. "Estimating uncertain spatial relationships in robotics," in Autonomous Robot Vehicles, I. J. Cox and G. T. Wilfon, Eds., 1990, pp. 167-193, Springer-Verlag, New York.

Sutton, R.S. et al., "Time-Derivative Models of Pavlovian Reinforcement", In Learning and Computational Neuroscience: Foundations of Adaptive Networks, J. Moore, ed., 1990, pp. 497-537, Cambridge, MA, MIT Press.

Taube, J. S., "Head Direction Cells and the Neurophysiological Basis for a Sense of Direction", Progress in Neurobiology, 1998, 225-256, vol. 55.

Thrun, S., "Robotic Mapping: A Survey." (In Exploring Artificial Intelligence in the New Millennium, G. Lakemeyer and B. Nebel, eds. (Morgan Kaufmann) 2003, pp. 1-35, San Francisco.

Touretzky et al., "Neural Representation of Space Using Sinusoidal Arrays," Neural Computation, 1993, pp. 869-884, vol. 5.

Trullier, O. et al., "Biologically-Based Artificial Navigation Systems: Review and Prospects," Progress in Neurobiology, 1997, pp. 483-544, vol. 51.

Tsodyks, M., "Attractor Neural Network Models of Spatial Maps in Hippocampus," Hippocampus, 1999, pp. 481-489, vol. 9.

Tulving, E., "Episodic and semantic memory", In Organisation of Memory, W. Donaldson, ed., 1972, pp. 381-403, Academic Press.

Ungerleider, L.G., et al., "'What' and 'where' in the human brain," Current Opinion in Neurobiology, 1994, pp. 157-165, vol. 4.

Vargha-Khadem, F. et al, "Differential Effects of Early Hippocampal Pathology on Episodic and Semantic Memory", Science, 1997, 376-380, vol. 277.

Voicu, H. et al., "Latent Learning, Shortcuts and Detours: A Computational Model," Behavioural Processes, 2002, pp. 67-86, vol. 59.

Wood, E. R. et al., "Hippocampal Neurons Encode Information About Different Types of Memory Episodes Occurring in the Same Location," Neuron, 2000, 623-633, vol. 27.

Wray, J., et al., "A model of color vision based on cortical reentry," Cerebral Cortex, Sep./Oct. 1996, pp. 701-716, vol. 6.

Zipser, D., "A Model of Hippocampal Learning During Classical Conditioning," Behavioral Neuroscience, 1986, pp. 764-776, vol. 100, No. 3.

* cited by examiner

BBD

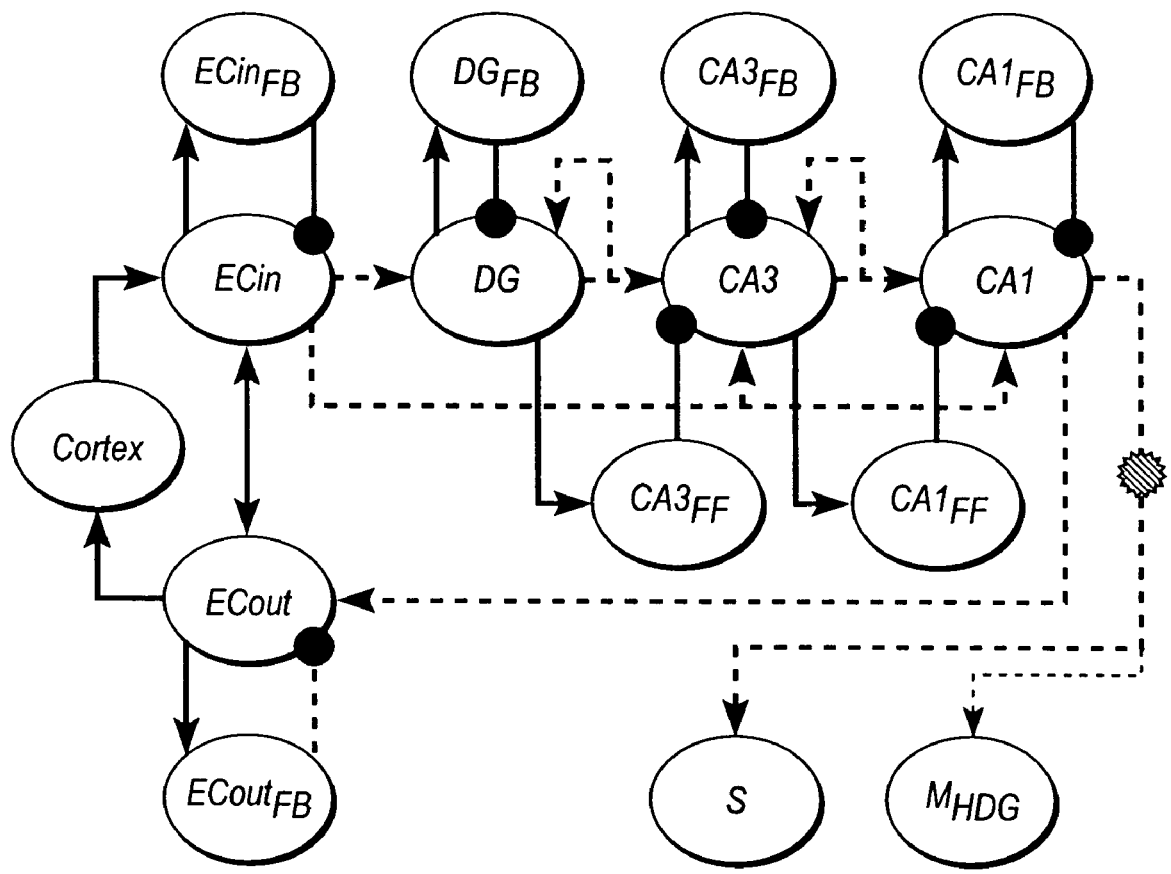
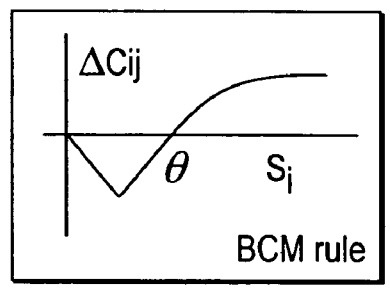
BCM rule
FIG. 3B

Probe Trial: Percentage in Goal Quadrant = 46

Probe Trial: Percentage in Goal Quadrant = 85

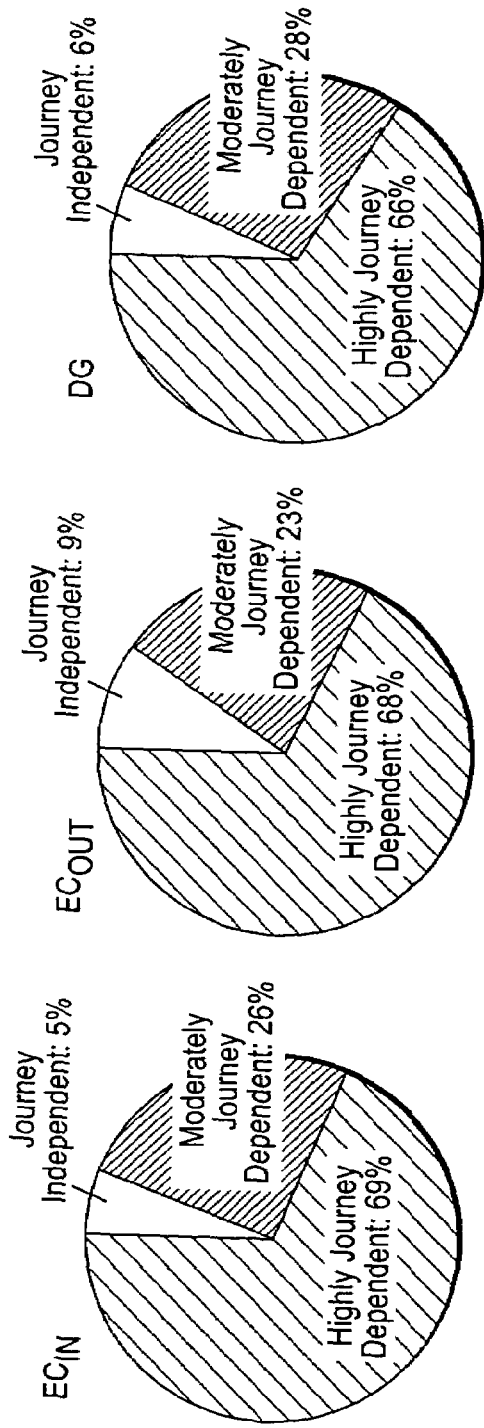

FIG. 8A  EC$_{IN}$ — Journey Independent: 5%, Moderately Journey Dependent: 26%, Highly Journey Dependent: 69%

FIG. 8B  EC$_{OUT}$ — Journey Independent: 9%, Moderately Journey Dependent: 23%, Highly Journey Dependent: 68%

FIG. 8C  DG — Journey Independent: 6%, Moderately Journey Dependent: 28%, Highly Journey Dependent: 66%

FIG. 8D  CA3 — Journey Independent: 4%, Moderately Journey Dependent: 13%, Highly Journey Dependent: 84%

FIG. 8E  CA1 — Journey Independent: 7%, Moderately Journey Dependent: 22%, Highly Journey Dependent: 71%

FIG. 8F  Hippocampus — Journey Independent: 7%, Moderately Journey Dependent: 25%, Highly Journey Dependent: 68%

MOBILE BRAIN-BASED DEVICE HAVING A SIMULATED NERVOUS SYSTEM BASED ON THE HIPPOCAMPUS

PRIORITY CLAIM

This application claims priority under 35 U.S.C. 119(e) to U.S. Provisional Patent Application No. 60/588,107, filed Jul. 15, 2004, entitled "Mobile Brain-Based Device Having a Simulated Nervous System Based on the Hippocampus," by Gerald M. Edelman et al., which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates to brain-based devices and, more particularly, to brain-based devices which can navigate in a real world environment.

BACKGROUND OF THE INVENTION

Intelligent systems have been developed which are intended to behave autonomously, automate tasks in an intelligent manner, and extend human knowledge. These systems are designed and modeled based on essentially three distinct fields of technology known, respectively, as
  (1) artificial intelligence (AD);
  (2) artificial neural networks (ANNs); and
  (3) brain-based devices (BBDs).

The intelligent systems based on AI and ANN include digital computers which are programmed to perform tasks as far ranging as playing chess to robotics. AI algorithms are logic-based and preprogrammed to carry out complex algorithms implemented with detailed software instructions. ANNs are an oversimplified abstraction of biological neurons that do not take into consideration nervous system structure (i.e. neuroanatomy) and often require a supervisory or teacher signal to get desired results. BBDs, on the other hand, are based on different principles and a different approach to the development of intelligent systems.

BBDs are based on fundamental neurobiological principles and are modeled after the brain bases of perception and learning found in living beings. BBDs incorporate a simulated brain or nervous system with detailed neuroanatomy and neural dynamics that control behavior and shape memory. BBDs also have a physical instantiation, called a morphology or phenotype, which allows active sensing and autonomous movement in the environment. BBDs, similar to living beings, organize unlabeled signals they receive from the environment into categories. When a significant environmental event occurs, BBDs, which have a simulated neuronal area called a value system, adapt the device's behavior.

The different principles upon which logic-based intelligent systems and BBDs operate are significant. As powerful as they are, logic-based machines do not effectively cope with novel situations nor process large data sets simultaneously. By their nature, novel situations cannot be programmed beforehand because these typically consist of unexpected and varying numbers of components and contingencies. Furthermore, situations with broad parameters and changing contexts can lead to substantial difficulties in programming. And, many algorithms have poor scaling properties, meaning the time required to run them increases exponentially as the number of input variables grows.

A challenging problem in intelligent systems such as autonomous robotic systems, therefore, is the successful exploration of unknown terrain. Exploration in the real world requires navigation and spatial memory tasks to be solved. However, the memory required to be successful in this task requires features only found in living beings and that are believed to be the hallmark of "episodic" memory, i.e. (1) the ability to put together multi-modal sensory information into coherent patterns, (2) the ability to put together information over time and recall temporal sequences, and (3) the ability to use memory for goal directed behavior. The hippocampus, which is located in the medial temporal lobe of the brain, and which has been well studied clinically and physiologically, is known to be crucial for memory and navigation in humans and animals. Consequently, the hippocampus has inspired prior biologically based navigation systems, some of which are computational hippocampal models and others of which are hippocampal models that have been applied to robots, but both of which have their limitations.

Prior computational hippocampal models have been run as simulations on a computer with virtual inputs. These computational hippocampal models make assumptions and use "a priori" information in order to get the appropriate responses to the inputs. For example, the hippocampal "place" cells (i.e. neurons that are active when the animal is in a specific location of the environment) of these computational models respond to a sensory input combination specifically engineered by the modeler, such as a 2-D (two-dimensional) point in Cartesian space. Part of the reason for these assumptions having been made is due to the computational hippocampal model not being situated in a real environment, thereby necessitating these biases.

Some of the computational hippocampal models have investigated the interaction between the hippocampus and other areas of the brain, such as the neocortex. However, in some the anatomy of these models was very simple and did not truly reflect hippocampal-cortical interactions in a meaningful way. One such model integrates the hippocampal formation with visual and path integration processing that could be thought of as cortical inputs and does make an assumption that path integration is solved by a moving bump of activity that reflects the animal movement on a map of the environment. This would not be feasible if the animal was in a real-world environment. Others have constructed a sophisticated model of the hippocampus with the appropriate connections in the hippocampus proper, with this model having been used to investigate memory conditions and issues. Although this model is quite detailed, the inputs into it are tokens or symbols which have no bearing to the processed multi-modal sensory input that converges on the hippocampus. This model produces an abstract output pattern that is read out as a memory recall. However, it is hard to resolve this response with that of, for example, a rodent where hippocampal responses lead to actual adaptive behavior.

While hippocampus models also have been instantiated on mobile robots, many of these also make assumptions, such as the "a priori" information driving the response of hippocampal "place" cells or of a map that is input to the hippocampus.

A few robotics models, which do include a neural simulation controlling the mobile robot in a navigation task, learn the mappings and hippocampal responses by autonomous exploration. One such model was very loosely tied to neurobiology and used learning algorithms similar to what is known as back propagation for learning. This developed a Simultaneous Localization and Mapping algorithm inspired by the rodent hippocampus, called RatSLAM, which is a hybrid between Artificial Intelligence SLAM systems and attractor dynamics thought to be represented in the hippocampus to create map-like representations of the environment. Yet others constructed a robotics model that integrated visual input with a head direction system, in which "place" cells, developed in the hippocampal layer of the model during exploration, and a biologically-based reward system drove learning between the "place" cells and goal-directed behavior. However, some features of the model are not true to the biology. (1) First, when the robotic model decided that a new place had been discovered, a "place" cell was added to a growing hippocampal layer. In a real being such as a rodent, a hippocampal cell can respond to multiple places depending on the context or any combination of inputs. This flexibility makes the hippocampus a multi-purpose memory map as opposed to a specialized positioning system. Also, hippocampal cells are not added on an as needed basis. (2) Second, the robotic model was feedforward and did not take into consideration the intrinsic and extrinsic looping that is a feature of the hippocampus. In yet another system, there was built a hippocampal neuroanatomy and a biologically-based goal system, which was tested on a mobile robot. However, "place" cells were artificial in the sense that the responses were designed to uniformly cover a grid of a controlled environment. The reward learning was used to build a cognitive map between these places. Moreover, although much of the details found in the hippocampus and the surrounding areas were included in the model, information flowed in a purely feedforward fashion through the model and did not loop back through the entorhinal cortex and then on to the neocortex.

Over ten years ago, a statistical framework for simultaneously creating maps while localizing the robot's position was developed, which has been commonly referred to as SLAM (Simultaneous Localization and Mapping). Since that time, the field of robotic mapping has been dominated by probabilistic techniques. The most popular is the estimation theoretic or Kalman filter based approach because it directly provides both a recursive solution to the navigation problem and a means of computing consistent estimates for vehicle and landmark locations based on statistical models of vehicle motion and landmark observations. These robotic approaches typically measure the distance to landmarks by laser range finders, sonar, or radar to create a map of landmarks and simultaneously estimate the position of the robot. These techniques have been very successful in creating maps for robots in certain office environments, in outdoor environments, and for unmanned aerial vehicles. However, these techniques have not addressed the problem of recognizing objects or situations and taking the appropriate actions, i.e. navigating.

SUMMARY OF THE INVENTION

The present invention is a brain-based device (BBD) that is able to adapt to varying terrain by learning which aspects of the terrain it can traverse and which aspects it must circumvent. The BBD makes decisions on aspects of the environment that go beyond mapmaking of prior robotic systems. These decisions require perceptual categorization of local object features, which the BBD of the present invention makes, thereby enabling the BBD to plot a course.

The BBD of the present invention includes a simulated nervous system having neural areas, specifically the hippocampus, the parietal cortex, the inferotemporal cortex, and a thalamic head direction system. The bi-directional connectivity between the hippocampus and these regions (see FIG. 3A), as well as the intricate connectivity within the hippocampus (see FIG. 3B), comprise a system that loops multimodal information over time and allows the formation of associative memories with a temporal context. The BBD also has a mobility base enabling it to move about in a real world environment under control of the simulated nervous system, together with a multi-sensor input enabling the BBD to recognize objects and select an action that has value consequences.

For those BBDs of the present invention that are to navigate in a complex terrain, these may combine signals from a laser or radar-based Simulated Localization and Mapping (SLAM) with the BBDs object recognition system and map of actions in space.

BRIEF DESCRIPTION OF THE FIGURES

FIG. 3B shows in detail the connectivity within the hippocampus region of FIG. 3A. The inset depicts the synaptic change rule, which is based on the BCM learning rule.

FIGS. 8A-8F are charts depicting journey dependent and independent cells in the hippocampus model.

DETAILED DESCRIPTION

Aspects of the invention are illustrated by way of example and not by way of limitation in the figures of the accompanying drawings in which like references indicate similar elements. It should be noted that references to "an", "one" and "various" embodiments in this disclosure are not necessarily to the same embodiment, and such references mean at least one. In the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 1:
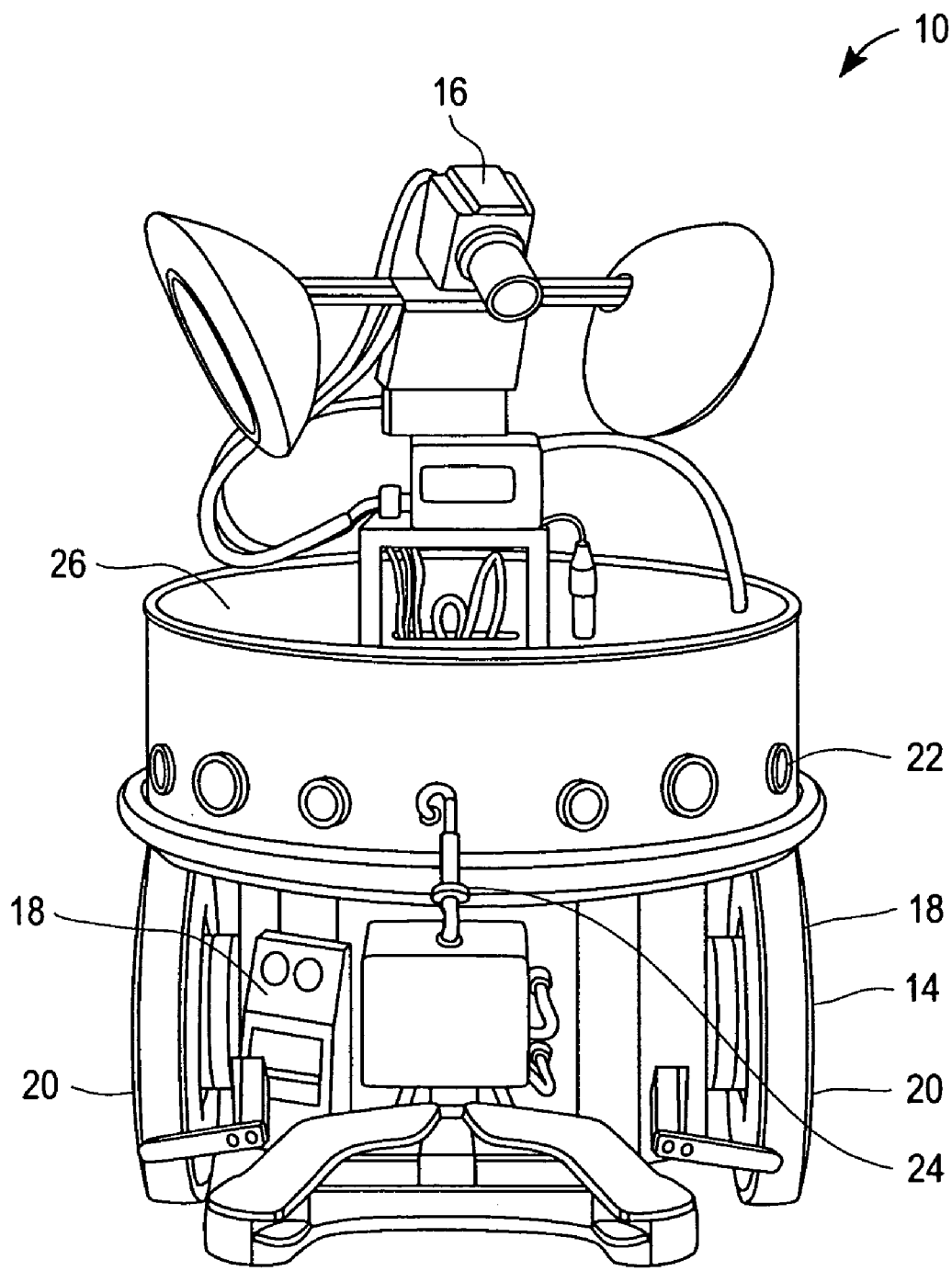
FIG. 1 is a pictorial view of a physical, mobile brain-based device.

FIG. 1 is a pictorial view of a brain-based device (BBD) of the present invention which includes a physically instantiated device, shown as one example as a mobile Neurally Organized Mobile Adaptive Device (NOMAD) 10 which can explore its environment and develop adaptive behavior while experiencing the environment. The brain-based device BBD also includes a simulated nervous system 12 (FIGS. 3A-3B) for guiding NOMAD 10 in its real-world environment. In one embodiment, the simulated nervous system 12, as will be further described, can run on a cluster of computer workstations (see FIG. 10) remote from NOMAD 10. In this embodiment, NOMAD 10 and the computer workstations communicate with one another via wireless communication, thereby enabling untethered exploration of NOMAD 10.

In the physical device example, NOMAD 10, as shown in FIG. 1, has a mobile base 14 and a CCD camera 16 for vision. NOMAD 10 also has odometry 18 for self-movement cues, effectors 20, seven infrared (IR) detectors 22 encircling NOMAD 10 for obstacle avoidance, and one downward facing IR detector 24 to detect a hidden platform (see FIGS. 2A-2B) within the enclosed environment in which it moves. On the top of NOMAD 10 are LEDs 26, which are detectable by two cameras (described below) situated over the environment in which NOMAD 10 moves, to track NOMAD's position in the environment.

The simulated nervous system 12 guides the behavior of NOMAD 10 based on the organization of real anatomy and physiology, and emphasizing a living organism's interaction with the environment. Thus, this behavior is based on the following design principles: (1) NOMAD 10 should engage in a behavioral task; (2) NOMAD's behavior should be controlled by a simulated nervous system having a design that reflects the brain's architecture and dynamics; (3) NOMAD 10 should be situated in the real-world; and (4) the behavior of NOMAD 10 and the activity of the simulated nervous system 12 should allow comparisons with empirical data. With these characteristics, BBD simulations tend to require networks of neuronal elements that reflect vertebrate brain architecture and dynamics, high performance computing to run the network in real-time, and the engineering of physical devices, e.g. NOMAD 10, to embody the network, all of which is described below.

Figure 2A:
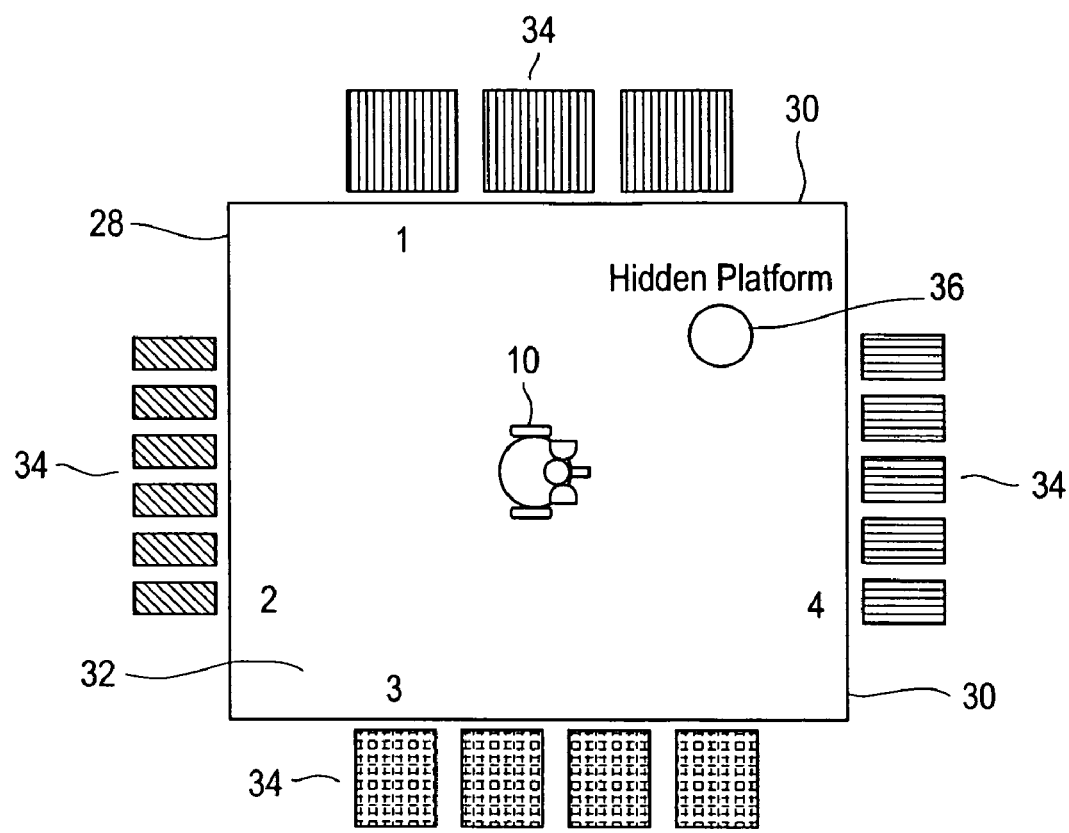
FIG. 2A is a schematic of the enclosed environment in which the BBD of the present invention moves.

FIG. 2A shows schematically a layout of the enclosed environment 28 in which NOMAD 10 moves. The enclosed environment 28 is, for example, 16'×14' with black walls 30 and black flooring 32. Sets of colored construction paper 34 of varying colors are hung on each of the black walls 30. As shown, each set 34 has a plurality of pieces of construction paper, with each piece in a given set 34 being of the same width but different in width than pieces in the other sets 34.

FIG. 2A also shows a hidden platform 36 which is 24" in diameter and made of reflective black construction paper. The hidden platform 36 is placed in the center of the upper right quadrant of the enclosed environment 28 for "hidden platform tasks" or trials described below. NOMAD 10 is able to detect the hidden platform 36, by use of the downward facing IR detector 24, when it is positioned over the platform 36.

Figure 2B:
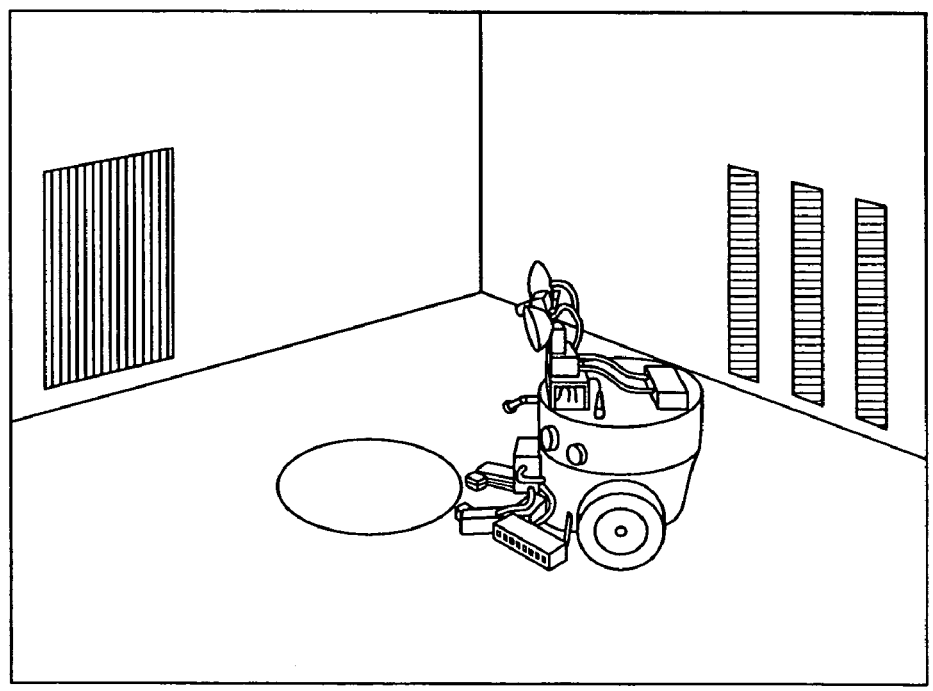
FIG. 2B is a snapshot photograph of the BBD in the enclosed environment depicted in FIG. 2A.

FIG. 2B is a snapshot showing NOMAD 10 in the enclosed environment 28. NOMAD 10 is also shown performing the hidden platform task which is used for assessing the BBD's spatial and episodic memory. As will be further described, the hidden platform task includes two phases, a set of "training" trials and a "probe" trial. In the training phase, NOMAD 10 will begin a number of trials, starting its movement from any one of a number of positions on the floor 32 until it encounters the hidden platform 36 or it times out, e.g., after 1000 seconds or 5000 cycles. After training, a probe trial is used to assess the BBD's memory performance. In the probe trial, the hidden platform 36 is removed from the enclosure 28 and NOMAD 10 is allowed to move about the enclosure for 5000 cycles.

Figure 3A:
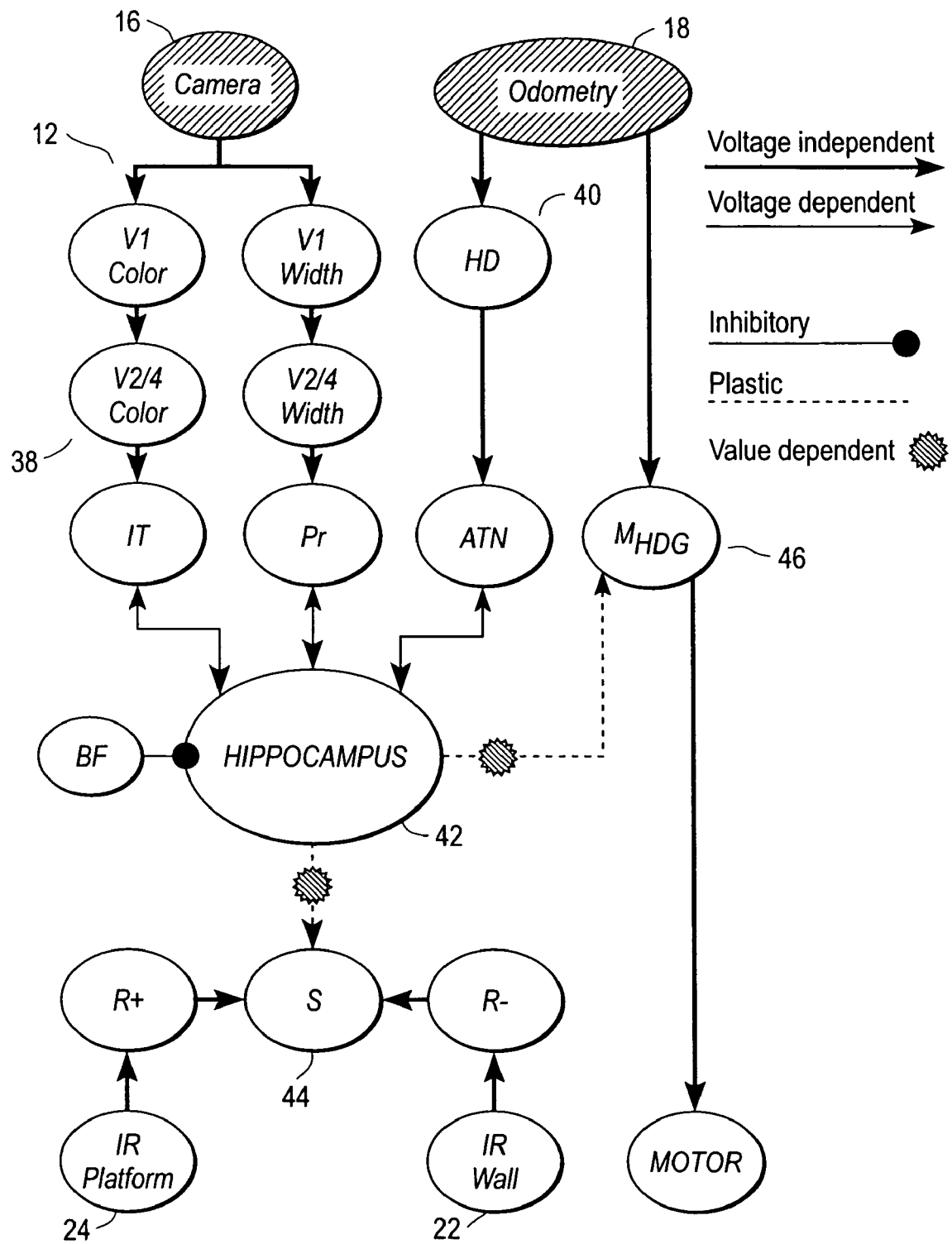
FIG. 3A is a schematic high level diagram of the regional and functional neuroanatomy of the simulated nervous system of the BBD of the present showing the neural simulation connection.

FIG. 3A is a schematic of the regional and functional neuroanatomy of the simulated nervous system 12, which includes the intricate anatomy and physiology of the hippocampus and its surrounding regions. This simulated nervous system 12 can integrate spatial signals from numerous objects in time and provide flexible navigation solutions to aid in the exploration of unknown environments, such as the environment 28. By simultaneously sampling from its neural regions during a navigation task, the architecture of the hippocampus, as described more fully below, provides a means to organize multi-modal information over different timescales which is important for the development of spatial and episodic memories.

The simulated nervous system 12, as shown in FIG. 3A, is modeled on the anatomy and physiology of the mammalian nervous system but, as can be appreciated, with far fewer neurons and a much less complex architecture. Simulated nervous system 12 includes a number of neural areas labeled according to the analogous cortical and subcortical regions of the human brain. Thus, FIG. 3A shows respective neural areas labeled as V1 Color, V2/4 Color, IT, V1 Width, V2/4 Width, Pr, HD, ATN, BF, Hippocampus, R+, S, R−, and MHDG. Each neural area V1 Color, V2/4 Color, etc. contains different types of neuronal units, each of which represents a local population of neurons. Each ellipse shown in FIG. 3A denotes a different neural area, with each such area having many neuronal units. To distinguish modeled or simulated neural areas from corresponding regions in the mammalian nervous system, the simulated areas are indicated in italics, e.g. IT.

The neuroanatomy of FIG. 3A also shows schematically the neural simulation 12 connectivity via various projections P (see arrows in the Figure). A projection P contains multiple synaptic connections between neuronal units. A synaptic connection allows a signal to be sent from a pre-synaptic neuronal unit to a post-synaptic neuronal unit. Projections P can either be within a neural area or between neural areas. Furthermore, projections P have properties as indicated by the legend in FIG. 3A, which are (1) "voltage independent", (2) "voltage dependent", (3) "plastic", (4) "inhibitory," and (5) "value dependent" and will be described in detail below.

Input to the simulated neural system 12 comes from the CCD camera 16, wheel odometry 18, and IR sensors 22, 24 for detection of walls 30 and hidden platform 36 of environment 28. The neural areas of simulated neural system 12 are analogous to the visual cortex (V1, V2/4), the inferotemporal cortex (IT), parietal cortex (Pr), head direction cells (HD), anterior thalamic nuclei (ATN), motor areas for egocentric heading ($M_{HDG}$), a value system (S), and positive and negative reward areas (R+, R−). The hippocampus is connected with the three major sensor input streams (IT, Pr, ATN), the motor system ($M_{HDG}$), and the value system (S). For clarity, the intrinsic connections within each of the neural areas are omitted from FIG. 3A.

FIG. 3B shows the detailed connectivity within the hippocampal region. The modeled hippocampus contains areas analogous to entorhinal cortex (ECIN, ECOUT), dentate gyrus (DG), the CA3 subfield, and the CA1 subfield. These areas contain interneurons that cause feedback inhibition (e.g. CA3→CA3FB→CA3), feedforward inhibition (e.g. DG→CA3FF→CA3), and rhythmic inhibition (e.g. Bf→*Hippocampus*)(FIG. 3A).

Much more detail of the simulated nervous system 12 is given in Table 1 and Table 2 described below. But overall, in the version of the simulated nervous system 12 used in the training and probe trials described in detail below, there are a total of 50 neuronal areas, 90,000 neuronal units within the 50 neuronal areas, and approximately 1.4 million synaptic connections.

The simulated nervous system 12 shown in FIG. 3A is comprised of five systems: (1) a visual system 38, (2) a head direction system 40, (3) a hippocampus formation 42, (4) a value system 44, and (5) an action selection system 46.

FIG. 3A. Visual System 38.

The visual system 38 is modeled on the primate occipito-temporal or ventral cortical pathway and a dorsal cortical pathway. The ventral cortical pathway shown in FIG. 3A, in the visual system (V1_color→V2/4_color→IT), contains neuronal units in successive areas having progressively larger receptive fields until, in inferotemporal cortex (IT), receptive fields cover the entire visual field and have no topography. The dorsal cortical pathway shown in FIG. 3A (V1_width→V2/4_width→Pr) contain neuronal units that respond to the size and position of objects.

Visual images from the CCD camera 16 are filtered for color and edges and the filtered output directly affects neural activity in area V1-Color and V1-Width. The CCD camera 16 sends, for example, 320×240 pixel RGB video images, via an RF transmitter on NOMAD 10, to a frame grabber attached to one of the computer workstations (described below) running the neural simulation. The image is spatially averaged to produce an 80×60 pixel image. Different sized Gabor filters (8×8, 16×16, 32×32, and 64×64) may be used to detect vertical edges of varying widths. The output of the Gabor function maps directly onto the neuronal units of the corresponding V1 width sub-areas (V1-width8, V1-width16, V1-width32, and V1-width64) (not shown in FIG. 3A). Color filters (e.g., red positive center with a green negative surround, red negative center with a green positive surround, blue positive with red-green negative, and blue negative with red-green positive) may be applied to the image. The outputs of the color filters are mapped directly onto the neuronal units of V1 Color sub-areas V1-red, V1-green, V1-blue, and V1-yellow (not shown in FIG. 3A). V1 neuronal units project retinotopically to neuronal units in V2/V4.

FIG. 3A. Head Direction System 40.

Neurons in the areas HD are often called "head direction" cells. Information obtained from the wheels 20 of NOMAD 10 is used to estimate the current heading of NOMAD 10. This information is input into the head direction neural area (HD). Each of the 360 HD neuronal units (see Table 1) has a cosine tuning curve, which responds maximally to a preferred heading with a tuning width of $\pi$ radians:

$$\cos(HD_i - curr\_heading)^5;$$

where $HD_i$ is a head direction cell with a preferred direction of $$\left(\frac{i}{360} 2\pi\right),$$

i ranges from 0 to 359, and curr_heading is NOMAD's heading, which is calculated from odometer information.

The head direction cells project topographically to an area analogous to the anterior thalamic nucleus (see HD→ATN in Table 2 and FIG. 3A) and to a motor area based on heading (see HD→$M_{HDG}$ in Table 2 and FIG. 3A-*note*, this path not in FIG. 3A). A new heading for NOMAD 10 is chosen based on the activity in neuronal area MHDG (see FIG. 3A—Action Selection, below, for further details).

Hippocampal Formation—Neural Area Hippocampus 42.

The architecture of the simulated hippocampal formation is based on rodent neuroanatomy. The input streams into the hippocampus are from the associative cortical areas in the simulated nervous system and arrive at the hippocampus via the entorhinal cortex (see ATN→$EC_{IN}$, IT→$EC_{IN}$, Pr→$EC_{IN}$ in Table 2 and FIGS. 3A-3B). The perforant path projects mainly from entorhinal cortex to the dentate gyrus but also to the CA3 and CA1 subfields (see $EC_{IN}$→DG EC $_{IN}$→CA3, $EC_{IN}$→CA1 in Table 2 and FIG. 3B). The mossy fibers (see DG→CA3 in Table 2 and FIG. 3B), Schaffer collaterals (see CA3→CA1 in Table 2 and FIG. 3B), and divergent projections from the hippocampus back to the cortex (see CA1→$EC_{OUT}$→ATN,IT,Pr) in Table 2 and FIGS. 3A-3B) are also present in the simulated nervous system 12. The prevalent recurrent connectivity found in the hippocampal formation is also included in the simulated nervous system 12 (see $EC_{IN}$→$EC_{OUT}$, DG→DG, and CA3→CA3 in Table 2 and FIG. 3B). All of the connections within the hippocampus proper (i.e., $EC_{IN}$, $EC_{OUT}$, DG, CA3, CA1) are value-independent and plastic (see section Synaptic Plasticity, below).

Unique patterns of intrinsic and extrinsic, feedback and feedforward inhibitory connections in the hippocampus may play an important role in hippocampus processing. Consequently, the simulated nervous system 12 includes feedback inhibitory connections (see EC→$EC_{FB}$→EC, DG→$DG_{FB}$→DG, CA3→$CA3_{FB}$→CA3, CA1→$CA1_{FB}$→CA1 in Table 2 and FIG. 3B) and feedforward inhibitory connections (see DG→$CA3_{FF}$→CA3, CA3→$CA1_{FF}$→CA1 in Table 2 and FIG. 3B). These connections are useful for separating inputs and network stability.

Basal Forebrain and Theta Rhythm (Table 2).

The simulated basal forebrain (BF) provides an extrinsic theta rhythm for the neural simulation. The function of the simulated basal forebrain area is to gate input into the hippocampus and keep activity levels stable. The BF area has a rhythmic activity over 13 simulation cycles:

$$BF(t) = theta(t \bmod 13);$$

where theta={0.01, 0.165, 0.33, 0.495, 0.66, 0.825, 1.00, 0.825, 0.66, 0.495, 0.33, 0.165, 0.01}. BF projects to all hippocampal areas with inhibitory connections (see BF→$EC_{IN}$, $EC_{OUT}$, DG, CA3, CA1 in Table 2). The level of inhibition, which is adaptive, keeps the activity in hippocampal regions within specific ranges:

$$\Delta sf_r(t) = (s_r(t) - tgt_r);$$

$$BF_r(t) = BF(t) + sf_r(t)$$

where r denotes the region (i.e. $EC_{IN}$, $EC_{OUT}$, DG, CA3, CA1), $sf_r(t)$ is the scale factor at time t, $s_r(t)$ is the percentage of active neuronal units in region r at time t, $tgt_r$ is the desired percentage of active units in area r ($EC_{IN}$=10%, $EC_{OUT}$=10%, DG=20%, CA3=5%, and CA1=10%), and $BF_r(t)$ is the presynaptic neuronal unit activity for a BF to hippocampus region r connection.

FIG. 3A. Value Systems and Temporal Difference Learning 44.

Activity in the simulated value systems 44 signals the occurrence of salient sensory events experienced by NOMAD 10 and this activity contributes to the modulation of connection strengths in the pathways shown. Initially, value system S is activated by the IR detector 24 that detects hidden platform 36 (see $R^+ \rightarrow S$ in Table 2 and FIG. 3A), causing potentiation of value dependent connections (CA1→S and CA1→$M_{HDG}$), or by obstacle avoidance the IR detectors 22 (see $R^- \rightarrow US$ in Table 2 and FIG. 3A), causing depression of value dependent connections. After learning, pursuant to the training trials mentioned above and described more fully below, the area CA1 can have an effect on area S activity. The magnitude of potentiation or depression is based on a neural implementation of a temporal difference (TD) learning rule:

$$TD(t) = \begin{cases} R^+(t) - \overline{S(t-\tau)}; & R^+ > 0 \\ \overline{S(t-\tau)} - R^-(t); & R^- > 0; \\ \overline{S(t)} - \overline{S(t-\tau)}; & \text{otherwise} \end{cases}$$

where $\overline{S(t)}$ is the average activity of the value system S at time t, τ is one theta cycle or 13 simulation cycles, $R^+$ is a positive reward and equal to 1 if the downward facing IR detector 24 is triggered, meaning that NOMAD 10 is over the hidden platform 36, and R is a penalty and equal to 1 if one of the seven IR detectors 22 around NOMAD's base is triggered, meaning that NOMAD 10 is too close to a wall 30. The basic idea of the temporal difference TD rule is that the learning is based on the difference between temporally successive predictions of rewards. In other words, the goal of the learning is to make the learner's current prediction for the current input pattern more closely match the next prediction at the next time interval (τ). If the predicted value increases, TD is positive and affected synaptic connections of the simulated nervous system 12 are potentiated, and if the predicted value decreases TD is negative and affected synaptic connections are depressed. After some experience, values should increase as NOMAD 10 heads toward the platform 36 and thus reinforce movements towards the platform 36. Alternatively, values should decrease as NOMAD 10 nears obstacles, and thus reinforce movements away from walls 30 and other obstacles. Further details on how the temporal difference is applied to individual synaptic connections are given below when describing Synaptic Plasticity.

FIG. 3A. Action Selection and Exploratory Behavior 46.

NOMAD 10 moves forward for 3 theta cycles (39 simulation cycles) and then selects a new heading, as described below. If NOMAD 10 detects an obstacle, it may reverse its direction for 24 inches, and then turn away from the IR sensor 22 that detected the obstacle. If NOMAD 10 detects the hidden platform 36, it may turn counter-clockwise 60 degrees and wait for 3 seconds, then turn clockwise for 60 degrees and wait 3 seconds, then another 60 degree clockwise turn and 3 second wait, and finally turn counter-clockwise returning to its original heading, all under control of system 12. The simulation ends at this point, and the current state of the simulated nervous system 12 is saved to hard disk. Otherwise, after 3 theta cycles, NOMAD 10 may choose a new heading based on activity in the motor area ($M_{HDG}$) of the simulated nervous system 12. From its original heading, NOMAD 10 may first turn counter-clockwise 60 degrees and wait for 3 seconds, then turn clockwise for 60 degrees and wait 3 seconds, then another 60 degree clockwise turn and 3 second wait, and finally turn counter-clockwise returning to its original heading, all under control of system 12. The average activity of $M_{HDG}$ is calculated during the wait periods. A softmax algorithm may be used to create a probability distribution for choosing a new heading based on the following equation:

$$p(newhdg) = \frac{\exp(40\,(\overline{M_{HDG}}(newhdg)))}{\sum_{h=hdg-60, hdg, hdg+60} \exp(40\,(\overline{M_{HDG}}(h)))};$$

where newhdg is a possible new heading for NOMAD 10, $\overline{M_{HDG}}$(newhdg) is the average activity of MHDG at a possible new heading, hdg is the current heading, and h has three positions (current heading, current heading less 60 degrees, current heading plus 60 degrees). After the simulated nervous system 12 selects a new heading, NOMAD 10 would be oriented to the new heading and then proceed forward for another 3 theta cycles before activating the heading selection process again.

Neuronal Units/Dynamics—Generally.

A neuronal unit within a neural area V1 Color, V1 Width etc. is simulated by a mean firing rate model. The state of each unit is determined by a mean firing rate variable (s). The mean firing rate variable of each unit corresponds to the average activity or firing rate variable of a group of roughly 100 neurons during a time period of approximately 200 milliseconds.

Synaptic connections between neural units, both within and between neuronal areas V1 Color, V1 Width, etc. are set to be either voltage-independent or voltage-dependent, and either plastic or non-plastic. Voltage-independent connections provide synaptic input to a postsynaptic neuron regardless of postsynaptic state of the neuron. Voltage-dependent connections represent the contribution of receptor types (e.g. NMDA receptors) that require postsynaptic depolarization to be activated.

In other words, a presynaptic neuron will send a signal along its axon through a synapse to a postsynaptic neuron. The postsynaptic neuron receives this signal and integrates it with other signals being received from other presynaptic neurons.

A voltage independent connection is such that if a presynaptic neuron is firing at a high rate, then a post-synaptic neuron connected to it via the synapse will fire at a high rate.

A voltage dependent connection is different. If the postsynaptic neuron is already firing at some rate when it receives a presynaptic input signal, then the voltage-dependent connection will cause the postsynaptic neuron to fire more. Since the postsynaptic neuron is active, i.e. already firing, this neuron is at some threshold level when receiving the input signal.

Therefore, this presynaptic connection will modulate the postsynaptic neuron to fire even more. The voltage-dependent connection, no matter how active the presynaptic neuron is, would have no effect on the postsynaptic neuron if the latter were not above the threshold value. Thus, the postsynaptic neuron has to have some given threshold of activity to be responsive or modulated by a voltage-dependent synaptic connection.

Neuronal Units.

The mean firing rate (s) of each neuronal unit ranges continuously from 0 (quiescent) to 1 (maximal firing). The state of a neuronal unit is updated as a function of its current state and contributions from voltage-independent, and voltage-dependent inputs. The voltage-independent input to unit i from unit j is:

$$A_{ij}^{VI}(t) = c_{ij}s_j(t);$$

where $s_j(t)$ is the activity of unit j, and $c_{ij}$ is the connection strength from unit j to unit i. The voltage-independent postsynaptic influence, $POST_i^{VI}$, on unit i is calculated by summing over all the inputs onto unit i:

$$POST_i^{VI}(t) = \varphi(POST_i^{VI}(t-1)) + (1-\varphi)\left(\sum_{l=1}^{M}\sum_{j=1}^{N_l}(A_{ij}^{VI}(t))\right);$$

where M is the number of different anatomically defined connection types (see Table 2), $N_1$ is the number of connections of type M projecting to unit i, and (P is the persistence of synaptic input.

The voltage-dependent input to unit i from unit j is:

$$A_{ij}^{VD}(t) = \Phi(POST_i^{VI}(t))c_{ij}s_j(t), \text{ where } \Phi(x) = \begin{cases} 0; & x < \sigma_i^{vdep} \\ x; & \text{otherwise} \end{cases};$$

where $\sigma_i^{vdep}$ is a threshold for the postsynaptic activity below which voltage-dependent connections have no effect (see Table 1).

The voltage-dependent postsynaptic influence on unit i, $POST_i^{VD}$, is given by:

$$POST_i^{VD}(t) = \varphi(POST_i^{VD}(t-1)) + (1-\varphi)\left(\sum_{l=1}^{M}\sum_{j=1}^{N_l}(A_{ij}^{VD}(t))\right);$$

A new activity, $s_i(t+1)$, is chosen based on the sum of the postsynaptic influences on neuronal unit i:

$$POST_i = \sum_{j=1}^{N_{VI}} POST_j^{VI} + \sum_{k=1}^{N_{VD}} POST_k^{VD};$$

The new activity for the neuronal unit is the activity level at the newly chosen phase, which is then subjected to the following activation function:

$$s_i(t+1) = \phi(\tanh(g_i(POST_i + \omega s_i(t))));$$

where $$\phi(x) = \begin{cases} 0; & x < \sigma_i^{fire} \\ x; & \text{otherwise} \end{cases};$$

where ω determines the persistence of unit activity from one cycle to the next, $g_i$ is a scaling factor, and $\sigma_i^{fire}$ is a unit specific firing threshold.

Specific parameter values for neuronal units are given in Table 1:

TABLE 1

Parameter Values. Specific values of parameters defining properties of the neuronal units are given in Table 1.

| Area | Size | σ-fire | σ-vdep | ω | g |
|---|---|---|---|---|---|
| V1 (8) | 60 × 80 | — | — | — | — |
| HD | 1 × 360 | — | — | — | — |
| R+ | 1 × 1 | — | — | — | — |
| R− | 1 × 1 | — | — | — | — |
| BF | 1 × 1 | — | — | — | — |
| V2/4-color (4) | 6 × 8 | 0.20 | 0.10 | 0.0 | 1.0 |
| V2/4-width (4) | 15 × 20 | 0.20 | 0.10 | 0.0 | 1.0 |
| IT | 30 × 30 | 0.20 | 0.10 | 0.0 | 1.0 |
| ITi | 15 × 15 | 0.20 | 0.10 | 0.15 | 1.0 |
| PR | 30 × 30 | 0.20 | 0.10 | 0.0 | 1.0 |
| ATN | 30 × 30 | 0.10 | 0.10 | 0.50 | 1.0 |
| ATNi | 30 × 30 | 0.10 | 0.10 | 0.15 | 1.0 |
| $M_{HDG}$ | 1 × 60 | 0.0 | 0.10 | 0.0 | 1.0 |
| $M_{HDG}i$ | 1 × 60 | 0.0 | 0.10 | 0.0 | 1.0 |
| S | 4 × 4 | 0.0 | 0.10 | 0.0 | 1.0 |
| $EC_{IN}$ | 30 × 30 | 0.10 | 0.10 | 0.50 | 1.0 |
| $EC_{IN}i$ | 15 × 15 | 0.02 | 0.10 | 0.0 | 1.0 |
| $EC_{OUT}$ | 30 × 30 | 0.10 | 0.10 | 0.50 | 1.0 |
| $EC_{OUT}i$ | 15 × 15 | 0.02 | 0.10 | 0.0 | 1.0 |
| DG | 30 × 30 | 0.10 | 0.10 | 0.50 | 0.75 |
| $DG_{FB}i$ | 15 × 15 | 0.02 | 0.10 | 0.0 | 1.0 |
| CA3 | 15 × 15 | 0.05 | 0.10 | 0.50 | 0.75 |
| $CA3_{FB}i$ | 8 × 8 | 0.02 | 0.10 | 0.0 | 1.0 |
| $CA3_{FF}i$ | 15 × 15 | 0.02 | 0.10 | 0.0 | 1.0 |
| CA1 | 20 × 20 | 0.05 | 0.10 | 0.50 | 0.75 |
| $CA1_{FB}i$ | 10 × 10 | 0.02 | 0.10 | 0.0 | 1.0 |
| $CA1_{FF}i$ | 10 × 10 | 0.02 | 0.10 | 0.0 | 1.0 |

As shown in Table 1, areas V1, HD, R+, R−, and BF are input areas and their activity is based on the camera image, odometry, and IR sensors respectively. Areas V1 and V2/V4 have 4 sub-areas for color (red, green, blue, and yellow) and 4 sub-areas for varying widths consistent with the example of the enclosed environment 28 in which NOMAD 10 navigates. Table 1 indicates the number of neuronal units in each area or sub-area (Size). Neuronal units in each area have a specific firing threshold (σ-fire), and a threshold above which voltage-dependent connections can have an effect (σ-vdep), a persistence parameter (ω), and a scaling factor (g).

Synaptic connections for the neuronal units are given in Table 2:

TABLE 2

Properties of Anatomical Projections. Specific properties of anatomical projections and connection types of the simulated nervous system are given in Table 2.

| Projection | Arbor | p | $c_{ij}(0)$ | type | $\phi$ | $\eta$ | k1 | k2 |
|---|---|---|---|---|---|---|---|---|
| V1-color→V2/4-color | [ ] 1 × 1 | 1.00 | 003, 0.050 | VI | — | 0.00 | 0.00 | 0.00 |
| V2/4-color→V2/4-color(intra) | [ ] 2 × 2 | 0.40 | 0.5, 0.6 | VD | — | 0.00 | 0.00 | 0.00 |
| V2/4-color→V2/4-color(inter) | [ ] 3 × 3 | 1.00 | −0.0012, −0.28 | VI | — | 0.00 | 0.00 | 0.00 |
| V1-width→V2/4-width | [ ] 1 × 1, 2 × 2, 3 × 3, 4 × 4 | 1.00 | 0.008, 0.009 | VI | — | 0.00 | 0.00 | 0.00 |
| V2/4-width→V2/4-width(intra) | [ ] 2 × 2 | 0.40 | 0.5, 0.6 | VD | — | — | — | — |
| V2/4-width→V2/4-width(inter) | [ ] 3 × 3 | 1.00 | −0.012, −0.014 | VI | — | — | — | — |
| V2/V4→IT | non-topo | 0.05 | 0.03, 0.04 | VI | — | — | — | — |
| IT→IT | [ ] 1 × 1 | 1.00 | 0.08, 0.14 | VI | — | — | — | — |
| IT→ITi | Θ 2, 3 | 1.00 | 0.06, 0.08 | VI | — | — | — | — |
| ITi→IT | [ ] 1 × 1 | 1.00 | −0.36, −0.50 | VI | — | — | — | — |
| V2/V4→Pr | [ ] 1 × 1 | 0.25 | 0.25, 0.30 | VD | — | — | — | — |
| Pr→Pr | Θ 4, 6 | 1.00 | −0.06, −0.08 | VI | — | — | — | — |
| HD→ATN | [ ] 30 × 2 | 0.20 | 0.01, 0.02 | VI | — | — | — | — |
| ATN→ATNi | Θ 10, 15 | 0.25 | 0.01, 0.02 | VI | — | — | — | — |
| ATNi→ATN | [ ] 1 × 1 | 1.00 | −0.36, −0.50 | VI | — | — | — | — |
| HD→$M_{HDG}$ | [ ] 1 × 1 | 1.00 | 0.01, 0.01 | VI | — | — | — | — |
| $M_{HDG}$ → $M_{HDG}$i | Θ 20, 30 | 0.50 | 0.10, 0.20 | VI | — | — | — | — |
| $M_{HDG}$i→ $M_{HDG}$ | [ ] 1 × 1 | 1.00 | −0.36, −0.50 | VI | — | — | — | — |
| ATN→$EC_{IN}$ | non-topo | 0.001 | 0.40, 0.50 | VI | — | — | — | — |
| IT→$EC_{IN}$ | non-topo | 0.001 | 0.40, 0.50 | VI | — | — | — | — |
| Pr→$EC_{IN}$ | non-topo | 0.001 | 0.40, 0.50 | VI | — | — | — | — |
| $EC_{IN}$→$EC_{OUT}$ | non-topo | 0.05 | 0.04, 0.08 | VI | — | — | — | — |
| $EC_{IN}$→$EC_{IN}$i | Θ 2, 3 | 0.10 | 0.45, 0.60 | VI | — | — | — | — |
| $EC_{IN}$i→$EC_{IN}$ | [ ] 1 × 1 | 1.00 | −0.90, −1.20 | VI | — | — | — | — |
| $EC_{IN}$→DG | [ ] 3 × 3 | 0.10 | 0.45, 0.60 | VI | 0.75 | 0.05 | 0.90 | 0.45 |
| $EC_{IN}$→CA3 | [ ] 3 × 3 | 0.05 | 0.15, 0.20 | VI | 0.75 | 0.05 | 0.90 | 0.45 |
| $EC_{IN}$→CA1 | [ ] 3 × 3 | 0.04 | 0.30, 0.40 | VI | 0.75 | 0.05 | 0.90 | 0.45 |
| $EC_{OUT}$→ATN | non-topo | 0.01 | 0.40, 0.45 | VD | — | — | — | — |
| $EC_{OUT}$→IT | non-topo | 0.01 | 0.40, 0.45 | VD | — | — | — | — |
| $EC_{OUT}$→Pr | non-topo | 0.01 | 0.40, 0.45 | VD | — | — | — | — |
| $EC_{OUT}$→$EC_{IN}$ | non-topo | 0.05 | 0.04, 0.08 | VI | — | — | — | — |
| $EC_{OUT}$→$EC_{OUT}$i | Θ 2, 3 | 0.10 | 0.45, 0.60 | VI | — | — | — | — |
| $EC_{OUT}$i→$EC_{OUT}$ | [ ] 1 × 1 | 1.00 | −0.90, −1.20 | VI | — | — | — | — |
| DG→CA3 | [ ] 3 × 3 | 0.03 | 0.45, 0.60 | VI | — | — | — | — |
| DG→$DG_{FB}$i | Θ 2, 3 | 0.10 | 0.45, 0.60 | VI | — | — | — | — |
| $DG_{FB}$i→DG | [ ] 1 × 1 | 1.00 | −0.90, −1.20 | VI | — | — | — | — |
| DG→$CA3_{FF}$i | Θ 2, 3 | 0.10 | 0.45, 0.60 | VI | — | — | — | — |
| $CA3_{FF}$i→CA3 | [ ] 1 × 1 | 1.00 | −0.90, −1.20 | VI | — | — | — | — |
| CA3→CA1 | [ ] 3 × 3 | 0.08 | 0.45, 0.60 | VI | 0.75 | 0.05 | 0.90 | 0.45 |
| CA3→CA3 | non-topo | 0.10 | 0.15, 0.20 | VI | 0.75 | 0.05 | 0.90 | 0.45 |
| CA3→$CA3_{FB}$i | Θ 2, 3 | 0.10 | 0.45, 0.60 | VI | — | — | — | — |
| $CA3_{FB}$i→CA3 | [ ] 1 × 1 | 1.00 | −0.90, −1.20 | VI | — | — | — | — |
| CA3→$CA1_{FF}$i | Θ 2, 3 | 0.10 | 0.45, 0.60 | VI | — | — | — | — |
| $CA1_{FF}$i→CA1 | [ ] 1 × 1 | 1.00 | −0.90, −1.20 | VI | — | — | — | — |
| CA1→$EC_{OUT}$ | [ ] 3 × 3 | 0.25 | 0.60, 0.75 | VI | 0.75 | 0.05 | 0.90 | 0.45 |
| CA1→$M_{HDG}$ # | [ ] 3 × 3 | 1.00 | 0.01, 0.02 | VD | — | 0.05 | 0.90 | 0.45 |
| CA1→S # | [ ] 3 × 3 | 1.00 | 0.01, 0.02 | VD | — | 0.005 | 0.90 | 0.45 |
| R+→S | non-topo | 1.00 | 0.25, 0.25 | VI | — | — | — | — |
| R−→S | non-topo | 1.00 | 0.25, 0.25 | VI | — | — | — | — |
| BF→ $EC_{IN}$, $EC_{OUT}$, DG, CA3, CA1 | non-topo | 0.05 | −0.01, −0.02 | VI | — | — | — | — |

As indicated in Table 2, a presynaptic neuronal unit connects to a postsynaptic neuronal unit with a given probability (p) and given projection shape (Arbor). This arborization shape can be rectangular "[ ]" with a height and width (h×w), doughnut shaped "Θ" with the shape constrained by an inner and outer radius (r1, r2), or non-topographical "non-topo" where any pairs of presynaptic and postsynaptic neuronal units have a given probability of being connected. The initial connection strengths, $c_{ij}(0)$, are set randomly within the range given by a minimum and maximum value (min, max). A negative value for $c_{ij}(0)$, indicates inhibitory connections. Connections marked with "intra" denote those within a visual sub-area and connections marked with "inter" denote those between visual sub-areas. Projections marked # are value-dependent. As already mentioned, a connection type can be voltage-independent (VI), or voltage-dependent (VD). $\phi$ denotes the persistence of the connection. Non-zero values for $\eta$, $k_1$, and $k_2$ signify plastic connections.

Synaptic Plasticity—Value Independent Plasticity.

Synaptic strengths are subject to modification according to a synaptic rule that depends on the phase and activities of the pre- and postsynaptic neuronal units. Plastic synaptic connections are either value-independent (see $EC_{IN}$→DG, CA3, CA1; DG→CA3; CA3→CA1; CA1→$EC_{OUT}$ in FIG. 3B and Table 2) or value-dependent (see CA1→S, CA1→$M_{HDG}$).

Both of these rules are based on a modified BCM learning rule in which synaptic change ($\Delta c_{ij}$) is a function of the post- and pre-synaptic neuronal unit's activity and a sliding threshold ($\theta$) as shown graphically in the insert next to FIG. 3B. Synapses between neuronal units with strongly correlated firing phases are potentiated and synapses between neuronal units with weakly correlated phases are depressed; the magnitude of change is determined as well by pre- and postsynaptic activities.

Thus, value-independent synaptic changes in $c_{ij}$ are given by:

$$\Delta c_{ij}(t+1) = \eta s_i(t) s_j(t) BCM(s_i)$$

where $s_i(t)$ and $s_j(t)$ are activities of post- and presynaptic units, respectively, and $\eta$ is a fixed learning rate. The function BCM is implemented as a piecewise linear function, taking post-synaptic activity as input, which is defined by a sliding threshold, $\theta$, two inclinations ($k_1, k_2$) and a saturation parameter $\rho$ ($\rho=6$ throughout):

$$BCM(s) = \begin{cases} -k_1 s; & s \leq \theta/2 \\ k_1(s-\theta); & \theta/2 < s \leq \theta \\ k_2 \tanh(\rho(s-\theta))/\rho; & \text{otherwise} \end{cases}$$

The threshold is adjusted based on the post-synaptic activity:

$$\Delta\theta = 0.25(s^2 - \theta)$$

Value-independent plasticity is subject to weight normalization to prevent unbounded potentiation:

$$C_{ij} = \frac{C_{ij}}{sqrt\left(\sum_{k=1}^{K} c_{kj}^2\right)};$$

where $c_{ij}$ is a particular connection, and K is the total number of connections onto neuronal unit j.

Synaptic Plasticity—Value Dependent Plasticity.

The rule for value-dependent plasticity differs from the value-independent rule in that synaptic change is governed by the pre-synaptic activity, post-synaptic activity, and temporal difference TD from the value systems (see above re Value System and Temporal Difference Learning). The synaptic change for value-dependent synaptic plasticity is given by:

$$\Delta c_{ij}(t+1) = \eta s_i(t) s_j(t) TD(t);$$

where TD(t) is the temporal difference value at time t.

Hidden Platform Task.

The hidden platform task assesses the BBD's spatial and episodic memory and involves both a training trial phase and a probe trial phase. NOMAD 10 begins a training trial from each of four starting locations on the floor 32 of enclosed environment 28 (see FIGS. 2A-2B) and explores the enclosure until it encounters the hidden platform 36 or it times out (after 1000 seconds or 5000 cycles). A training block is defined as a set of four such trials from each of the four starting locations. Four training blocks (16 total trials) are completed by the BBD during training, and the results are described below in connection with FIGS. 4-5 After training is completed, the BBD undergoes a probe trial, in which the hidden platform 36 is removed, to assess the BBD's memory performance, which is explained below in relation to FIG. 6.

Training and probing in the hidden platform tasks are repeated with nine slightly different BBD "subjects". Each "subject" included the same physical device, i.e. NOMAD 10, but each possessed an altered simulated nervous system 12. This variability among "subjects" was a consequence of random initialization in both the microscopic details of connectivity between individual neuronal units and the initial connection strengths between those units. The overall connectivity among neuronal units remained similar among different "subjects", however, inasmuch as that connectivity was constrained by the synaptic pathways, arborization patterns, and ranges of initial connection strengths (see FIGS. 3A-3B and Table 2 for specifics).

Figure 4:
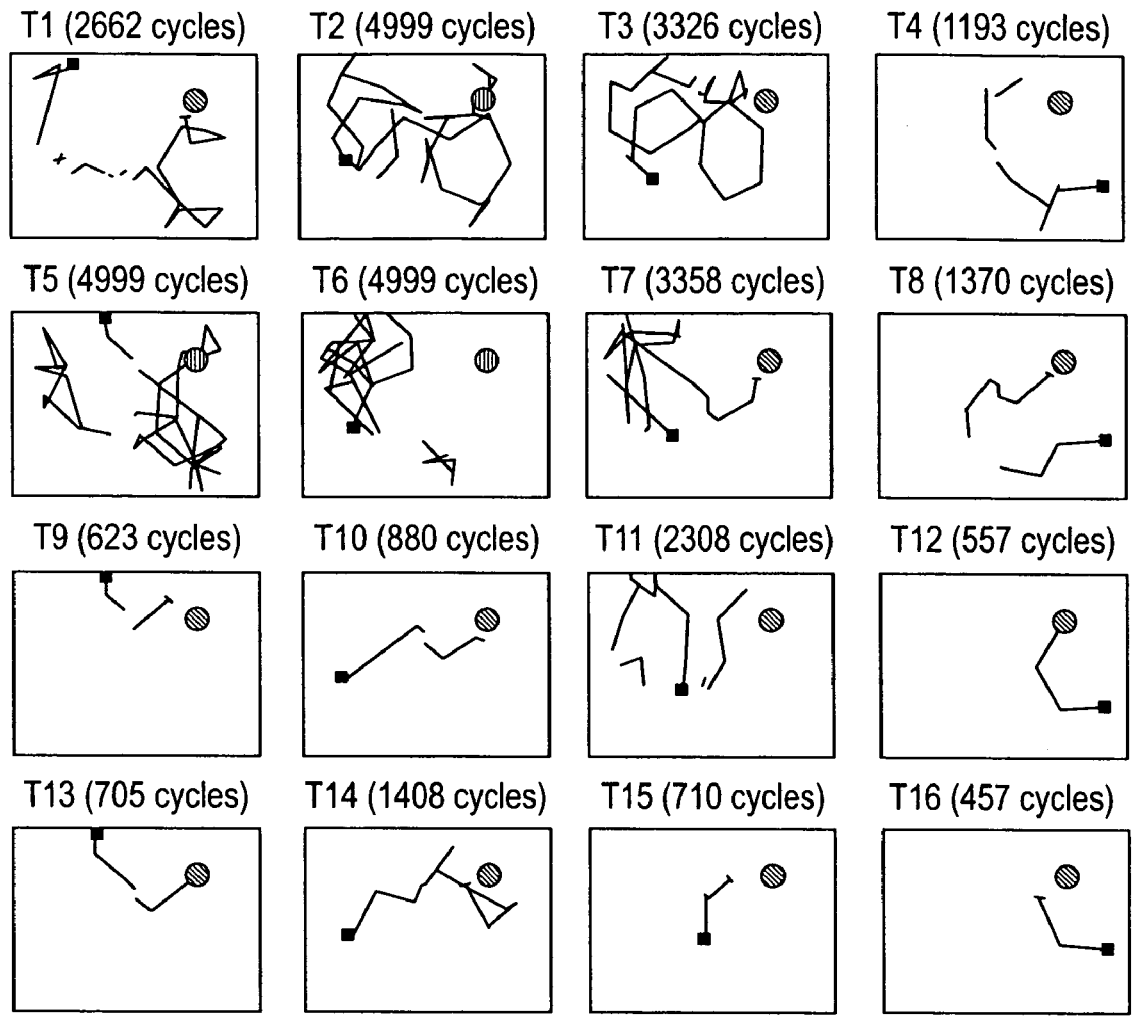
FIG. 4 pictorially shows representative trajectories of the BBD of the present invention during hidden platform training trials.

FIG. 4 shows representative trajectories of NOMAD 10 during 16 respective hidden platform training trials. The position of NOMAD 10 was recorded by the overhead cameras (not shown) above the enclosures 28. Each box in FIG. 4 shows a trajectory of NOMAD 10 during a trial (T1-T16), and the number of simulation cycles it took for NOMAD 10 to find the hidden platform 36. NOMAD 10 started its trajectory from the small black square shown in each figure and moved to find the hidden platform 36. The hidden platform 36 is shown as a green circle in the figure if NOMAD 10 found the platform 36 within 5000 simulation cycles and is shown as a red circle if it did not find the hidden platform 36 during the trial period. By the midpoint of its training, i.e. after trial T8, NOMAD 10 is able to make trajectories essentially directly toward the hidden platform 36 from its starting point.

During each such simulation cycle of the BBD, sensory input to the simulated nervous system 12 is processed, the states of all neuronal units are computed, the connection strengths of all plastic connections are determined, and motor output is generated. In the trials, execution of each simulation cycle required approximately 200 milliseconds of real time. Every simulation cycle, the positions of NOMAD 10, its heading, and the state of all neuronal units are recorded and saved on a hard disk.

Results. Nine "subjects" were run on the hidden platform task.

Figure 5:
FIG. 5 is a graph of mean escape times of several embodiments of the BBD of the present invention tested during a hidden platform task.

Overall, the group of "subjects" learned the hidden platform task and showed improvement, as measured by the time to find the hidden platform 36, as training progressed. This improvement is indicated in FIG. 5, which is a graph of the mean escape times of the nine "subjects" tested during the hidden platform task. As shown in FIG. 5, each "subject" ran four trial blocks with four trials within each block. Error bars denote the standard deviation. Escape times were significantly shorter for blocks 3 and 4 than block 1 ($p<0.01$) and than block 2 ($p<0.05$). The P-values are derived from the known Wilcoxon sign rank test.

Probe Trial. During the probe trial, in which the hidden platform 36 was removed and "subjects" explored the environment 28 for 5000 simulation cycles or approximately 17 minutes, "subjects" spent a significant amount of time searching in the region where the hidden platform 36 would have been located. Seven "subjects" were tested in the probe trial and the "subjects" spent approximately half their time ($\mu=0.50$, $\sigma^2=0.23$) in the quadrant of the enclosure 36 that had contained the hidden platform 36.

Figure 6A:
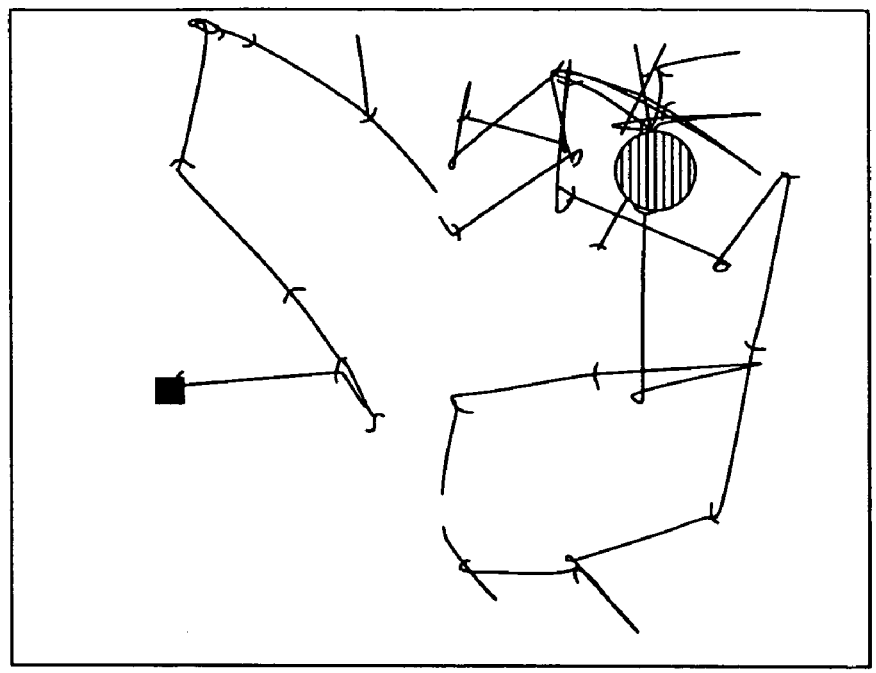
FIGS. 6A and 6B show pictorially the trajectories of respective embodiments of the BBD of the present invention during a probe trial.
Figure 6B:
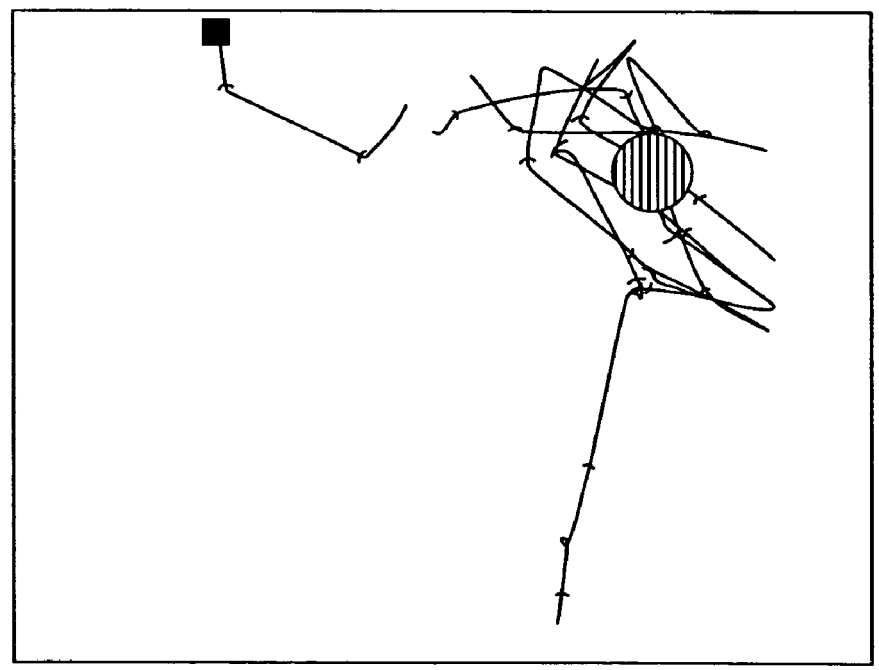
Figure 7A:
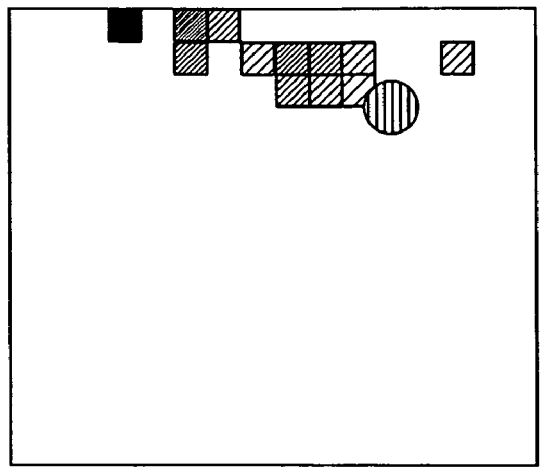
FIGS. 7A-7D show four representation "place" cells recorded in a simulated neuronal area CA1.
Figure 7B:
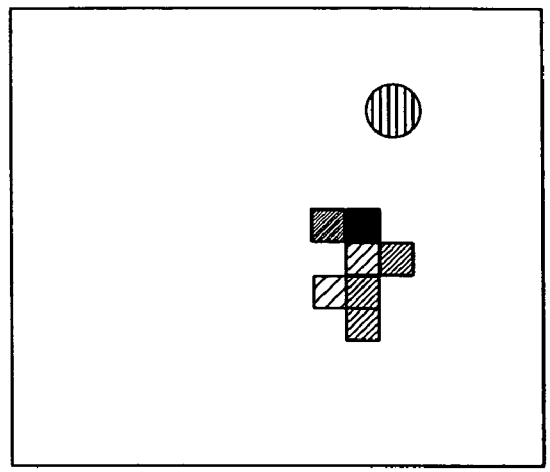
Figure 7C:
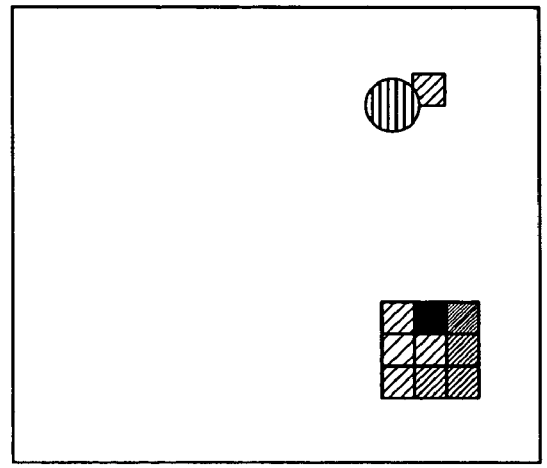
Figure 7D:
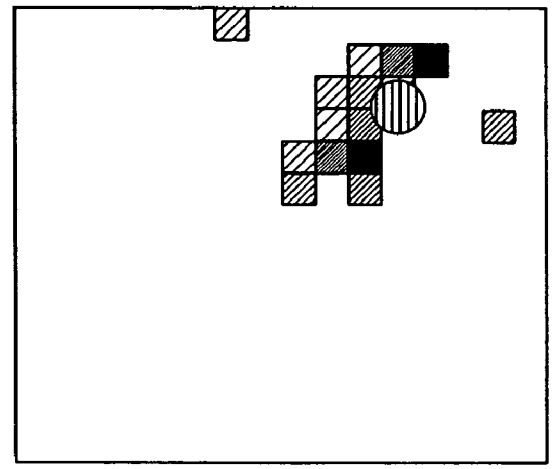
Figure 9D:
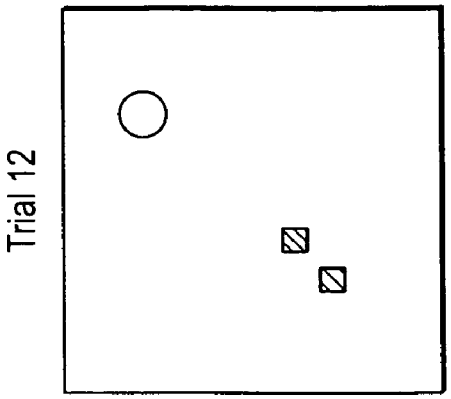
FIGS. 9A-9H illustrate a representative journey dependent "place" cell in neuronal area CA1 during respective trials.
Figure 9H:
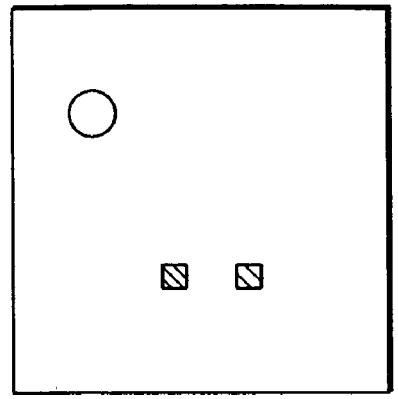
Figure 9C:
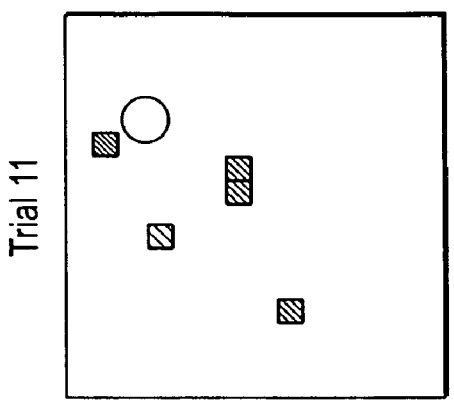
Figure 9G:
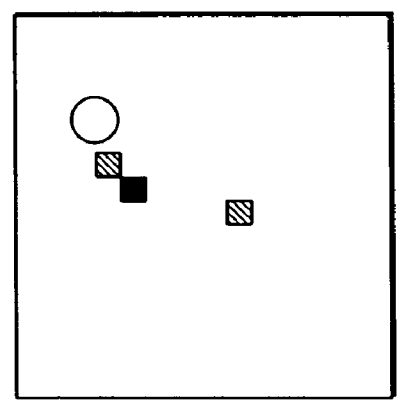
Figure 9B:
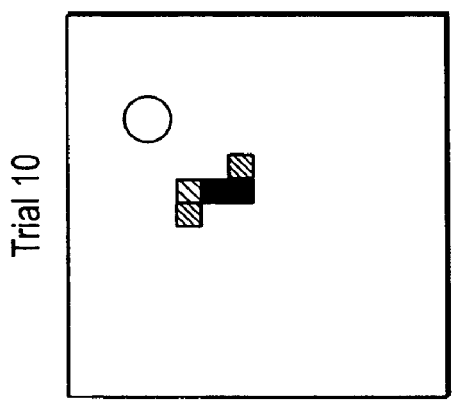
Figure 9F:
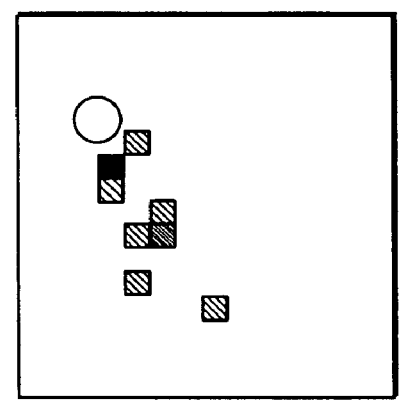
Figure 9A:
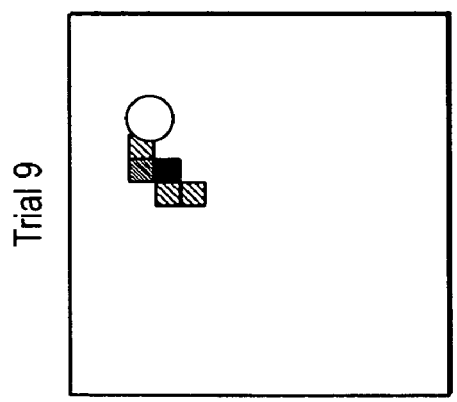
Figure 9E:
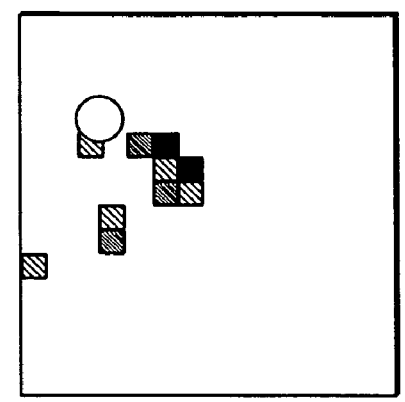

FIGS. 6A-6B show trajectories of "subjects" during the probe trial in which the hidden platform 36 was removed. The red circles denote the location of the hidden platform 36 during the training trials. FIG. 6A shows a "subject" with average performance spent 46% of its time in the quadrant where the hidden platform 36 was used during the training trials described above. FIG. 6B shows that the "subject" that represented a better performance during the probe trial spent 85% of the time in the hidden platform quadrant.

Neural Response. Many of the neuronal units in the hippocampal areas of the simulated nervous system 12 have responses typical of what are called hippocampal "place" cells where the neuronal unit was active exclusively while NOMAD 10 was in a specific region of the environment 28. This is indicated in FIGS. 7A-7D, which show four representative "place" cells recorded in simulated neuronal unit CA1 of the hippocampus. Each rectangle represents the enclosure 28 that NOMAD 10 explores and each pixel represents a one foot square in the enclosure 28. The color of the pixel represents the activity of a given CA1 neuronal unit and is normalized from quiescent (white) to maximal firing rate (black). The red circle for these figures denotes the location of the hidden platform 36.

The response of neuronal units is not only place specific, but also context specific. This is a critical requirement for an episodic memory system and could only happen in a system that has architecture facilitating the integration of inputs over time. Many of the neuronal units respond at a particular place in the enclosure 28 depending on NOMAD's trajectory. These units are called "journey dependent cells". Units have been found with retrospective coding (i.e. current activity is based on its prior experience to that point) by looking at cells in all the simulated hippocampus areas that responded near the hidden platform 36 (e.g., within 3 feet). In all training and probe trials, NOMAD 10 visited this location. However, as shown in FIGS. 8A-8F, the majority of these cells responded only on a subset of trials, while a smaller proportion of units responded on a majority of the trials regardless of trajectory.

More specifically, FIGS. 8A-8F are charts showing journey dependent and journey independent cells in the hippocampus model. Neuronal units that were active (average activity>0.1) and that had "place" fields centered within 3 feet of the hidden platform 36 were used in the analysis. Journey independent cells were active in 5 or more trials, moderately journey dependent cells were active in 3 to 4 trials, and highly journey dependent cells were active in only 1 to 2 trials. FIGS. 8A-8F show the proportions of journey independent and journey dependent cells in each hippocampal subregion ($EC_{IN}$, $EC_{OUT}$, DG, CA3, CA1) and in the hippocampus overall (FIG. 8F).

In many cases NOMAD 10 demonstrated stereotypical trajectories from a given starting position to the hidden platform 36. Roughly 10% of the highly journey dependent cells were active near the location of the hidden platform 36 with similar trajectories (i.e. trials 9 and 13, trials 10 and 14, trials 11 and 15, trials 12 and 16).

FIGS. 9A-9H illustrate a representative "journey dependent" "place" cell in the neuronal area CA1. This cell was most active near the hidden platform 36 (open circle in the figures) on training trials 9 and 13 where NOMAD 10 started from the wall 30 at the top of the figures. Activity is normalized to the maximum firing rate over all training trials for this cell where white denotes no activity and black denotes maximal activity.

Figure 10:
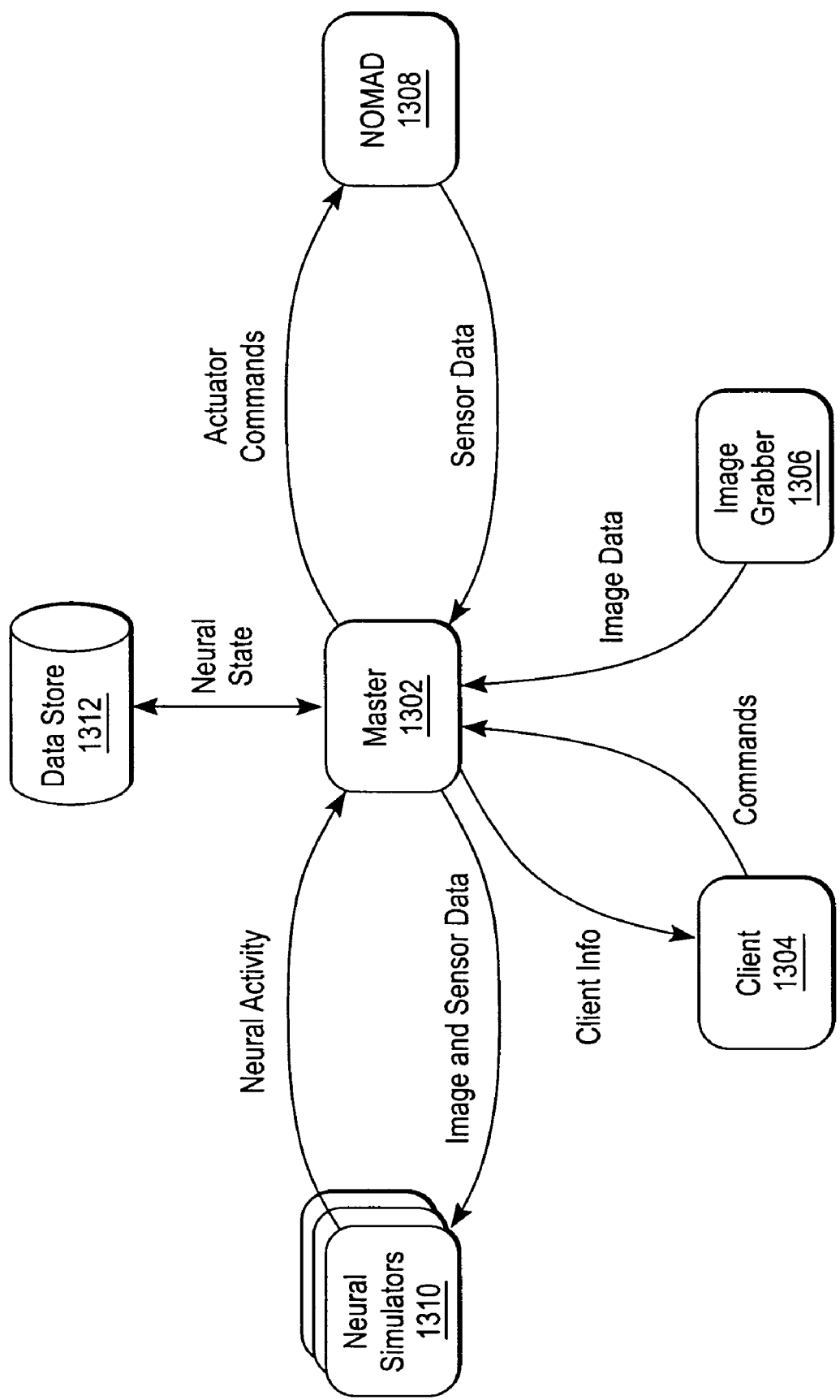
FIG. 10 is an exemplary illustration of a system in accordance with various embodiments of the present invention.

FIG. 10 is an exemplary illustration of a computer system in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments, the components illustrated in FIG. 10 can be implemented in one or more programming languages (e.g., C, C++, Java™, and other suitable languages). Components can communicate using Message Passing Interface (MPI) or other suitable communication means, including but not limited to shared memory, distributed objects and Simple Object Access Protocol (SOAP). MPI is an industry standard protocol for communicating information between computing devices (or nodes). In one embodiment, the system can be deployed on a multi-processor computer architecture such as (but not limited to) a Beowulf cluster. Beowulf clusters are typically comprised of commodity hardware components (e.g., personal computers running the Linux operating system) connected via Ethernet or some other network. The present disclosure is not limited to any particular type of parallel computing architecture. Many other such architectures are possible and fully within the scope and spirit of the present disclosure.

Referring to FIG. 10, master component 1302 can coordinate the activities of the other components according to commands received from client 1304. In one embodiment, the client 1304 can be a stand-alone process or that programmatically controls the master according to a script or other scenario and/or in reaction to client information (e.g., neural activity, sensor readings and camera input) received from the master. Client commands can instruct the master 1302 to start or stop the brain-based device BBD experiment, save the experiment state on data store 1312, read the experiment state from the data store 1312, set the running time/cycles in which the experiment will execute, and set parameters of the neural simulators 1310.

In another embodiment, the client 1304 can be a user interface that receives information from the master 1302 and allows a user to interactively control the system. By way of a non-limiting example, a user interface can include one or more of the following: 1) a graphical user interface (GUI) (e.g., rendered with Hypertext Markup Language); 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular GUI. Those of skill in the art will recognize that many other user interfaces are possible and fully within the scope and spirit of this disclosure.

The neuronal units for each neural area are each assigned to a neural simulator 1310. Each neural simulator 1310 is responsible for calculating the activity of the neuronal units that have been assigned to it. A given neural area's neuronal units may be distributed across one or more neural simulators 1310. In various embodiments, there can be one neural simulator 1310 per Beowulf node. In order to optimize performance, neuronal units can be distributed among neural simulators such that the average number of synaptic connections on the neural simulators is approximately the same. In other embodiments, neuronal units can be distributed such that the average number of neuronal units per neural simulator is approximately the same. Neural simulators periodically or continuously exchange the results of calculating the activity of their neuronal units with other neural simulators and the master. This information is required so that neuronal units on other neural simulators have up-to-date pre-synaptic inputs. The master provides actuator commands to NOMAD 10 based on the neural activity received from the neural simulators 1310.

The master periodically receives image data from image grabber 1306 and distributes it to the neural simulators 1310 and to the client 1304. In one embodiment, the images are taken from the CCD camera 16 mounted on NOMAD 10 that sends the RGB video images, via an RF transmitter, to an ImageNation PXC200 frame grabber 1306. The image is then spatially averaged to produce a pixel image. Gabor filters can be used to detect edges of vertical and horizontal orientations (as briefly described above). The output of the Gabor function is mapped directly onto the neuronal units of the corresponding V1 width neural areas. Color filters are also applied to the image, with the outputs of the color filters being mapped directly onto the neuronal units of V1 Color.

The master 1302 also periodically acquires sensor data from NOMAD 10 component 1308 and distributes it to the neural simulators 1310. In one embodiment, a micro controller (PIC17C756A) onboard the NOMAD 10 samples input and status from its sensors and controls an RS-232 communication between the NOMAD 10 base and master 1302. Sensor information can include, in addition to video information previously described, gripper state, camera position, infrared detectors, whisker deflection, wheel speed and direction and odometer count.

Figure 11:
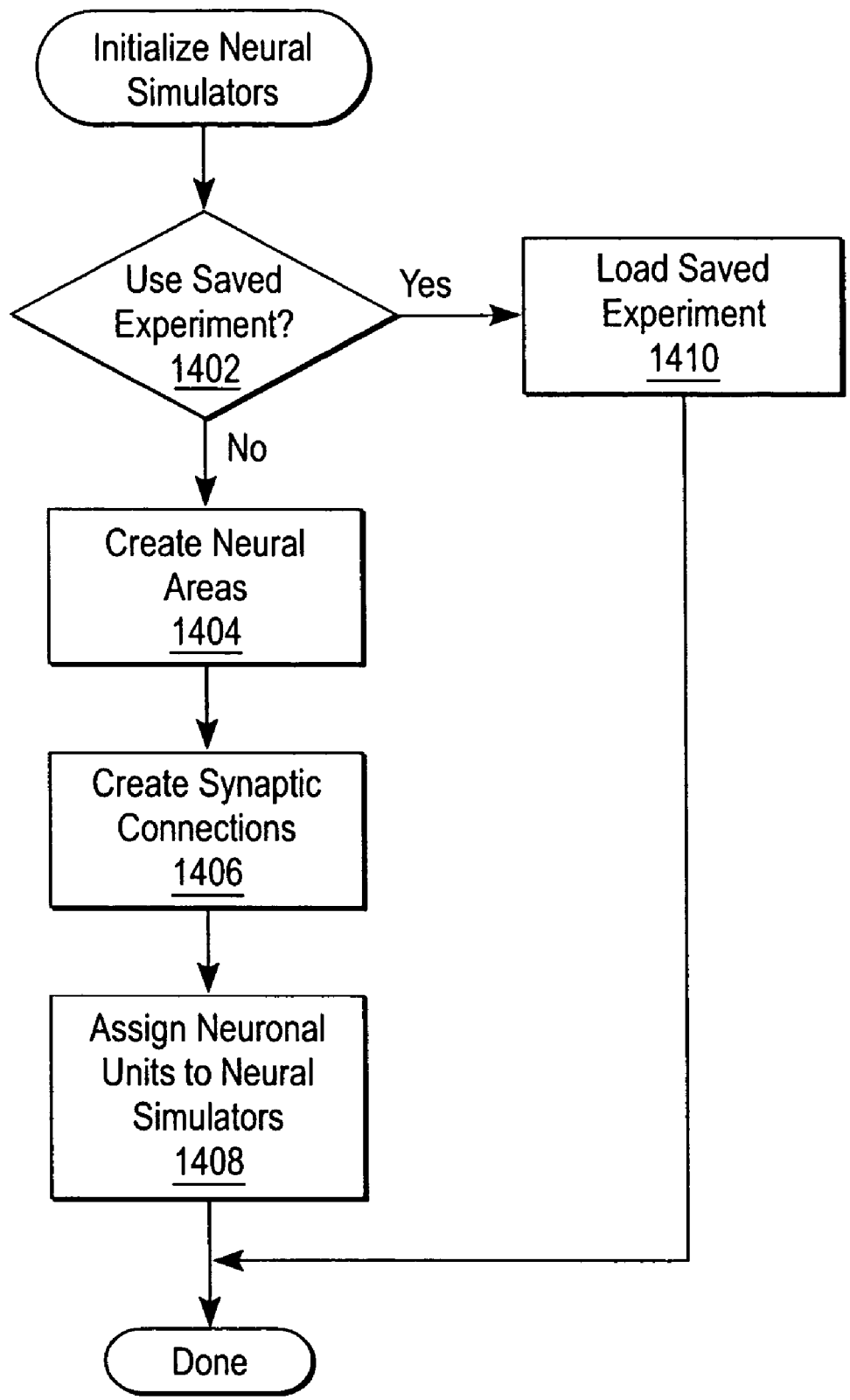
FIG. 11 is a flow diagram illustration of neural simulator initialization.

FIG. 11 is a flow diagram illustration of neural simulator initialization in accordance with various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways. In step 1402, it is determined based on command(s) from the client 1304 whether or not a saved trial should be retrieved from the data store 1312 or whether a new trial should be started. If the trial is to be retrieved from the data store, this is performed in step 1410. In various embodiments, the trial state can be stored as an Extensible Markup Language (XML) document, a plain text file, or a binary file. Otherwise, in step 1404 neuronal units are created according to the parameters given in Table 1. Next, in step 1406 synaptic connections are created between the neuronal units according to the parameters in Table 2. Finally, each neuronal unit is assigned to a neural simulator in step 1408.

Figure 12:
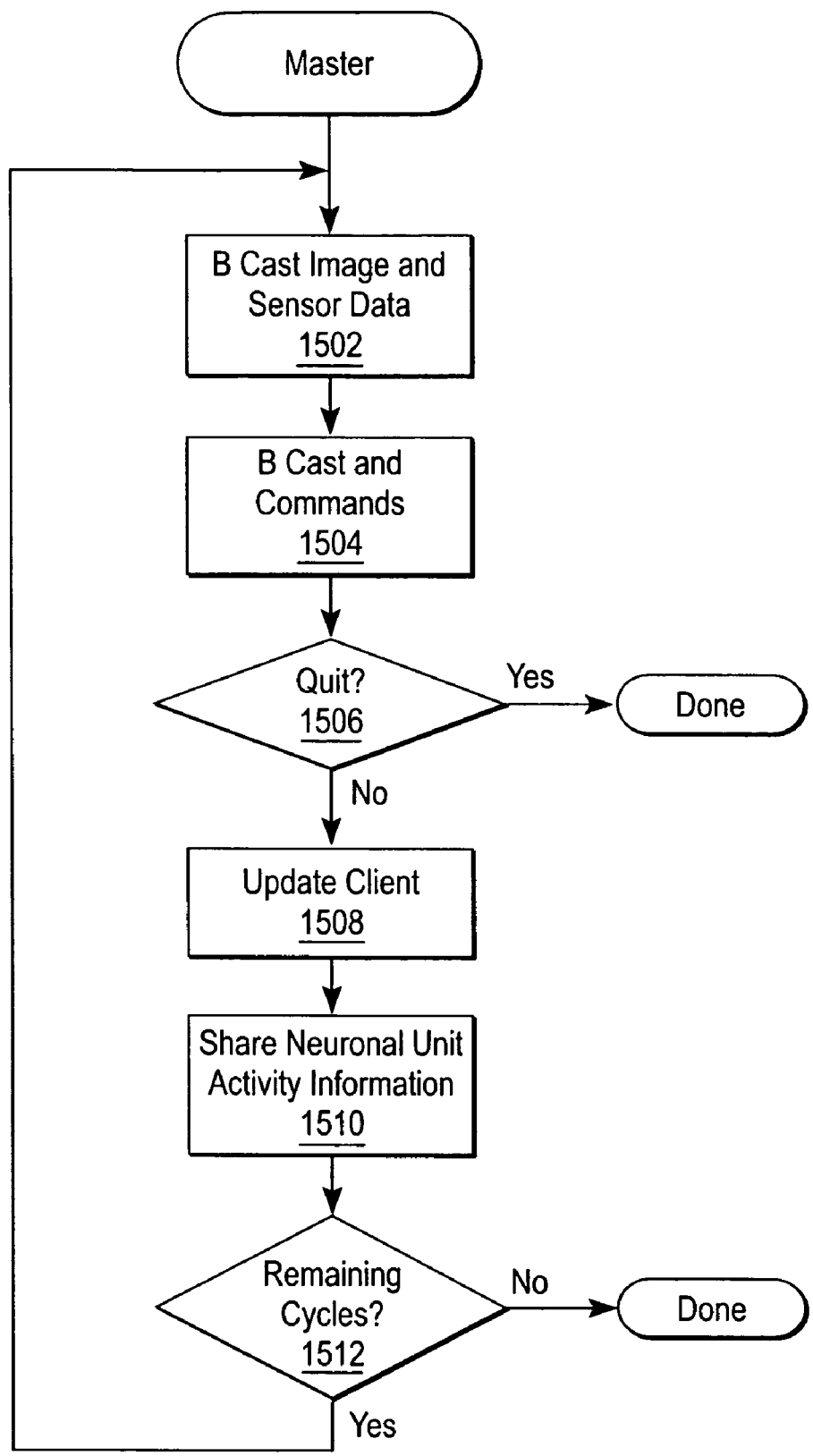
FIG. 12 is a flow diagram illustration of the master component in accordance with various embodiments of the invention.

FIG. 12 is a flow diagram illustration of the master component in accordance with various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In step 1502 the master 1302 broadcasts image and sensor data that it has acquired from the image grabber and NOMAD 10 to the neural simulators and the client. In step 1504, the master broadcasts any commands it may have received to the neural simulators. In step 1506, it is determined whether or not the client 1304 has directed the master 1302 to quit the experiment. If so, the master ceases the experiment (which may include saving the state of the experiment to the data store). Otherwise, in step 1508 the updated information is provided to the client which could serve to update a GUI. In step 1510, neuronal unit activity from the neural simulators 1310 is shared among all components (e.g., via MPI). The neuronal activity can be provided in some form to the client as part of the client information. Finally, it is determined whether or not there are any remaining cycles left in the simulation. If not, the trial terminates. Otherwise, the master 1302 returns to step 1502.

Figure 13:
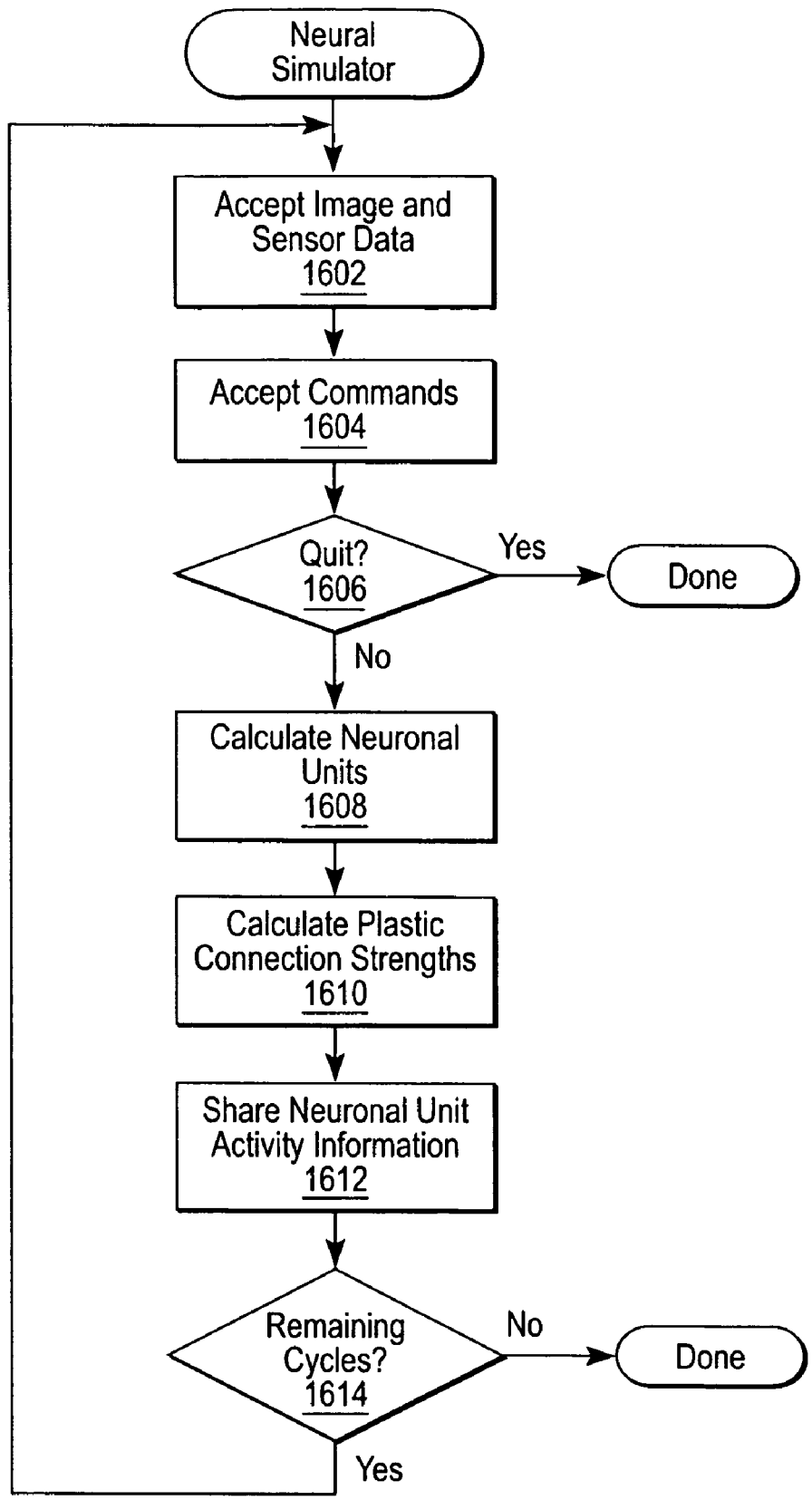
FIG. 13 is a flow diagram of a neural simulator in accordance with various embodiments of the invention.

FIG. 13 is a flow diagram illustration of a neural simulator in accordance to various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In step 1602, the neural simulators 1310 accept image and sensor data that is broadcast by the master 1302. In step 1604, client commands broadcast by the master 1302 are accepted. In step 1606, it is determined whether or not the client 1304 has directed the master 1302 to quit the trial. If so, the neural simulators 1310 complete their execution. Otherwise, in step 1608 the value of the neuronal units assigned to the neural simulators are calculated. In step 1610, the strengths of plastic connections are calculated. Local neuronal unit activity is shared in step 1612 with other neural simulators and the master. In addition, neuronal activity from other neural simulators is acquired and used to refresh local values. Finally, it is determined in step 1614 whether or not there are any remaining cycles left in the trial. If not, the trial terminates. Otherwise, the neural simulators 1310 return to step 1602.

Various embodiments may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor/device to perform any of the features presented herein. The storage medium can include, but is not limited to, one or more of the following: any type of physical media including floppy disks, optical discs, DVDs, CD-ROMs, microdrives, magneto-optical disks, ROMs, RAMs, EPROMs, EEPROMs, DRAMs, VRAMs, flash memory devices, magnetic or optical cards, nanosystems (including molecular memory ICs); and any type of media or device suitable for storing instructions and/or data. Various embodiments include a computer program product that can be transmitted over one or more public and/or private networks wherein the transmission includes instructions which can be used to program a computing device to perform any of the features presented herein.

Stored in one or more of the computer readable medium (media), the present disclosure includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

SUMMARY

The BBD of the present invention demonstrates the acquisition and recall of spatial memories by observing the hippocampus unit activity during its behavior in the environment 28, and is shown to have context dependent neural responses, which is a prerequisite for episodic memory.

The BBD methodology described above is used for investigating episodic and spatial memory. Unlike prior computational models of the hippocampus, the BBD is employed in the environment 28 and no presumptions about the environmental inputs are made, nor are assumptions made about the behavioral actions of NOMAD 10 to solve the spatial memory task. Moreover, unlike prior robotic systems that have some abstraction of the hippocampus to build spatial memories, the BBD has neural dynamics coupled with detailed neuroanatomy (see Table 1 and Table 2) at a systems neuroscience level.

The BBD model described herein takes into consideration the macro and micro anatomy between the hippocampus and cortex, as well as the neuronal areas within the hippocampus. The BBD developed mappings from the neural responses in the hippocampus to purposeful behavior (see FIG. 4-FIG. 6). It developed "place" cells, comparable to those seen in a rodent, without assumptions or instructions (see FIGS. 7 and 9). These responses came about based on autonomous exploration of NOMAD 10 and the integration of three input streams (visual what or IT, visual where or Pr, and self-movement or ATTN) over time.

It is believed that the multiple loops from the cortex to hippocampus (FIG. 3A) and within the hippocampus proper (FIG. 3B) are important for integrating inputs over time and building spatial memory that depends on context (see FIGS. 8-9). These context-dependent responses are critical for the acquisition and recall of sequences of multimodal memories and are the hallmark of episodic memory.

What is claimed is:

1. A mobile brain-based device for navigating in a real-world environment, comprising:
    a) a mobile adaptive device having sensors for sensing multi-modal information in the real-world environment;
    b) a simulated nervous system for receiving and processing the multi-modal information sensed by the sensors and, in response, for outputting information to control movement of said mobile adaptive device in the environment; and
    c) wherein said simulated nervous system includes sensor input streams, an output motor stream, and a neural area analogous to the hippocampus and coupled to said sensor input streams and to said output motor stream of the simulated nervous system, and wherein said sensor input streams comprise a neural area analogous to an inferotemporal cortex (IT), a neural area analogous to a parietal cortex (Pr), and a neural area analogous to an anterior thalamic nuclei (ATN) system.

2. A mobile-brain based device according to claim 1, wherein said mobile adaptive device comprises means for sensing images.

3. A mobile-brain based device according to claim 2, wherein said neural area analogous to the inferotemporal cortex (IT) processes color information of the images.

4. A mobile-brain based device according to claim 2, wherein said neural area analogous to the parietal cortex (Pr) processes width information of the images.

5. A mobile brain-based device according to claim 2, wherein said mobile adaptive device comprises means for sensing heading information.

6. A mobile brain-based device according to claim 5, wherein said neural area analogous to the anterior thalamic nuclei (ATN) processes the heading information.

7. A mobile brain-based device according to claim 1, wherein the neural area analogous to the hippocampus is coupled, respectively, to the neural area analogous to the inferotemporal cortex (IT), the parietal cortex (Pr), and the anterior thalamic nuclei (ATN) via projections (P).

8. A mobile brain-based device for navigating in a real-world environment, comprising:
    a) a mobile adaptive device having sensors for sensing multi-modal information in the real-world environment;
    b) a simulated nervous system for receiving and processing the multi-modal information sensed by the sensors and, in response, for outputting information to control movement of said mobile adaptive device in the environment; and
    c) wherein said simulated nervous system includes sensor input streams, an output motor stream, a neural area analogous to the hippocampus and coupled to said sensor input streams and to said output motor stream of the simulated nervous system, and a neural area analogous to a value system (S) and coupled to the neural area analogous to the hippocampus.

9. A mobile brain-based device according to claim 8, wherein said mobile adaptive device comprises means for sensing obstacles in the real-world environment in which said mobile adaptive device moves.

10. A mobile brain-based device according to claim 9, wherein said value system (S) includes a positive reward (R+) and a negative reward (R−) system to provide control information, respectively, to the neural area analogous to the hippocampus if an obstacle being sensed is one being looked for or the obstacle being sensed is to be avoided.

11. A mobile brain-based device for navigating in a real-world environment, comprising:
    a) a mobile adaptive device having sensors for sensing multi-modal information in the real-world environment;
    b) a simulated nervous system for receiving and processing the multi-modal information sensed by the sensors and, in response, for outputting information to control movement of said mobile adaptive device in the environment; and
    c) wherein said simulated nervous system includes sensor input streams, an output motor stream, a neural area analogous to the hippocampus and coupled to said sensor input streams and to said output motor stream of the simulated nervous system, and a neural area analogous to a motor area for egocentric heading ($M_{HDG}$).

12. A mobile brain-based device according to claim 11, wherein the neural area analogous to the hippocampus outputs control information to the neural area analogous to the motor area for egocentric heading to control the movement of said mobile adaptive device.

13. A mobile brain-based device for navigating in a real-world environment, comprising:
    a) a mobile adaptive device having sensors for sensing multi-modal information in the real-world environment;
    b) a simulated nervous system for receiving and processing the multi-modal information sensed by the sensors and, in response, for outputting information to control movement of said mobile adaptive device in the environment; and
    c) wherein said simulated nervous system includes sensor input streams, an output motor stream, and a neural area analogous to the hippocampus and coupled to said sensor input streams and to said output motor stream of the simulated nervous system, and wherein the neural area analogous to the hippocampus comprises neural areas analogous to the entorhinal cortex (Ee), dentate gyms (DG), subfield (CA3) and a subfield (CA1).

14. A mobile brain-based device according to claim 13 wherein within the neural area analogous to the hippocampus there are projections (P) for coupling the entorhinal cortex (Fe), the dentate gyrus (DG) and the subfield (CA3) and the subfields (CA1) to one another.

15. A mobile brain-based device for navigating in a real-world environment, comprising:
   a) a mobile adaptive device having sensors for sensing multi-modal information in the real-world environment;
   b) a simulated nervous system for receiving and processing the multi-modal information sensed by the sensors and, in response, for outputting information to control movement of said mobile adaptive device in the environment; and
   c) wherein said simulated nervous system includes sensor input streams, an output motor stream, and a neural area analogous to the hippocampus and coupled to said sensor input streams and to said output motor stream of the simulated nervous system, wherein said sensor input streams include a neuronal area analogous to the cortex, and wherein said neuronal area analogous to the hippocampus and said neuronal area analogous to the cortex are coupled through multiple loops to integrate the multi-modal information over time and to build spatial memory.

16. A mobile brain-based device for navigating in a real-world environment, comprising:
   a) a mobile adaptive device having sensors for sensing multi-modal information in the real-world environment;
   b) a simulated nervous system for receiving and processing the multi-modal information sensed by the sensors and, in response, for outputting information to control movement of said mobile adaptive device in the environment; and
   c) wherein said simulated nervous system includes sensor input streams, an output motor stream, a neural area analogous to the hippocampus and coupled to said sensor input streams and to said output motor stream of the simulated nervous system, and a neural area analogous to a basal forebrain (BF) to gate input into the neural area analogous to the hippocampus.

* * * * *

UNITED STATES PATENT AND TRADEMARK OFFICE
CERTIFICATE OF CORRECTION

| | | |
|---|---|---|
| PATENT NO. | : 7,467,115 B2 | Page 1 of 1 |
| APPLICATION NO. | : 11/179371 | |
| DATED | : December 16, 2008 | |
| INVENTOR(S) | : Gerald M. Edelman et al. | |

It is certified that error appears in the above-identified patent and that said Letters Patent is hereby corrected as shown below:

In Column 1, at line 13, insert therefor:

--Statement Regarding Federally Sponsored Research And Development:
This invention was made with Government support under N00014-03-1-0980 awarded by the Office of Naval Research. The United States Government has certain rights in the invention.--

Signed and Sealed this

Fifteenth Day of March, 2011

David J. Kappos
*Director of the United States Patent and Trademark Office*